US012629616B2

(12) United States Patent
Kang et al.

(10) Patent No.: US 12,629,616 B2
(45) Date of Patent: May 19, 2026

(54) WATER PURIFYING FILTER ASSEMBLY

(71) Applicant: SAMSUNG ELECTRONICS CO., LTD., Suwon-si (KR)

(72) Inventors: Wanku Kang, Suwon-si (KR); Sanggyu Jung, Suwon-si (KR); Junggeun Lee, Suwon-si (KR); Sungpil Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 354 days.

(21) Appl. No.: 18/079,483

(22) Filed: Dec. 12, 2022

(65) Prior Publication Data

US 2023/0115880 A1     Apr. 13, 2023

Related U.S. Application Data

(63) Continuation of application No. PCT/KR2021/004992, filed on Apr. 21, 2021.

(30) Foreign Application Priority Data

Jun. 15, 2020    (KR) ........................ 10-2020-0072078
Sep. 29, 2020    (KR) ........................ 10-2020-0127112

(51) Int. Cl.
B01D 35/12      (2006.01)
B01D 29/52      (2006.01)
B01D 35/30      (2006.01)
(52) U.S. Cl.
CPC ............. B01D 35/12 (2013.01); B01D 29/52 (2013.01); B01D 35/301 (2013.01); *B01D 2201/301* (2013.01); *B01D 2201/4061* (2013.01)

(58) Field of Classification Search
CPC ...... B01D 35/12; B01D 29/52; B01D 35/301; B01D 2201/301; B01D 2201/4061;
(Continued)

(56) References Cited

U.S. PATENT DOCUMENTS 7,662,283 B2 *  2/2010  Eserkaln ................... C02F 9/20
                                                   210/232
8,298,420 B2 * 10/2012  Burrows .............. B01D 61/081
                                                   210/450

(Continued)

FOREIGN PATENT DOCUMENTS

CN          110575704 A      12/2019
EP          2 802 399 B1      3/2020
(Continued)

OTHER PUBLICATIONS

Supplementary European Search Report dated Sep. 27, 2023, issued in European Application No. 21 82 6513.0.
(Continued)

*Primary Examiner* — Waqaas Ali
(74) *Attorney, Agent, or Firm* — STAAS & HALSEY LLP

(57)              ABSTRACT

A water purifying filter assembly including a filter case including a receiving member having a protrusion; and a head assembly. The protrusion may be configured to be receivable in a recessed portion on an outer circumferential surface of a filter so that when the filter is placed in the receiving member with the protrusion received in the recessed portion, the filter is fixedly couplable to the head assembly by rotation of the filter, and when the filter is placed in the receiving member with the protrusion not received in the recessed portion, the filter is prevented from being fixedly couplable to the head assembly.

16 Claims, 17 Drawing Sheets

<u>1</u>

(58) Field of Classification Search
    CPC .... B01D 2201/4015; B01D 2201/4046; B01D
                                    35/305; B01D 35/306
    See application file for complete search history.

(56)                References Cited

U.S. PATENT DOCUMENTS

| | | | |
|---|---|---|---|
| 9,901,852 B2 | 2/2018 | Huda et al. | |
| 11,077,392 B2 | 8/2021 | Fiox et al. | |
| 11,400,395 B2 | 8/2022 | Park et al. | |
| 12,036,493 B2 | 7/2024 | Rubin | |
| 2005/0000885 A1 | 1/2005 | Stockbower | |
| 2007/0227959 A1 | 10/2007 | Sinur et al. | |
| 2010/0000919 A1 | 1/2010 | Kim | |
| 2013/0081989 A1* | 4/2013 | Metaxatos | B01D 35/301 |
| | | | 210/232 |
| 2015/0267657 A1 | 9/2015 | Morris | |

FOREIGN PATENT DOCUMENTS

| | | | | |
|---|---|---|---|---|
| KR | 20-0426288 | | | 9/2006 |
| KR | 10-0718566 | | | 5/2007 |
| KR | 20-0439241 | | | 3/2008 |
| KR | 20-2011-0006467 | | | 6/2011 |
| KR | 20110006467 | U | * | 6/2011 |
| KR | 20-0454614 | | | 7/2011 |
| KR | 10-1083691 | | | 11/2011 |
| KR | 10-1148053 | | | 5/2012 |
| KR | 10-2012-0113113 | | | 10/2012 |
| KR | 10-2012-0126840 | | | 11/2012 |
| KR | 10-2014-0043624 | | | 4/2014 |
| KR | 10-1409451 | | | 6/2014 |
| KR | 10-1496224 | | | 2/2015 |
| KR | 10-1686914 | | | 12/2016 |
| KR | 10-2017-0119646 | | | 10/2017 |
| KR | 10-2017-0119647 | | | 10/2017 |
| KR | 10-2018-0007663 | | | 1/2018 |
| KR | 10-1957684 | | | 3/2019 |
| KR | 10-1951763 | | | 5/2019 |
| KR | 10-2019-0121875 | | | 10/2019 |
| KR | 10-2021-0046298 | | | 4/2021 |

OTHER PUBLICATIONS

International Search Report, PCT/ISA/210, dated Aug. 17, 2021, issued in PCT Application No. PCT/KR2021/004992.
Written Opinion, PCT/ISA/237, dated Aug. 17, 2021, issued in PCT Application No. PCT/KR2021/004992.
Chinese Office Action dated Jun. 3, 2025 for Chinese Application No. 202180042941.X.
European Office Action dated Feb. 24, 2025 for European Application No. 21826513.0.
Korean Office Action dated Sep. 11, 2025 for Korean Application No. 10-2020-0127112.
European Search Report dated Oct. 6, 2025 for European Application No. 25184093.0.
European Office Action dated Feb. 16, 2026 for European Application No. 25184093.0.

* cited by examiner

1

WATER PURIFYING FILTER ASSEMBLY

CROSS-REFERENCE TO RELATED APPLICATIONS

This application is a continuation application, under 35 U.S.C. § 111(a), of International Application No. PCT/KR2021/004992, filed on Apr. 21, 2021, which claims priority to Korean Patent Application No. 10-2020-0072078, filed on Jun. 15, 2020, and Korean Patent Application No. 10-2020-0127112, filed on Sep. 29, 2020, the disclosures of which are incorporated by reference herein in their entireties.

BACKGROUND

1. Field

The present disclosure relates to a water purifying filter assembly including an improved structure.

2. Description of the Related Art

In general, a filter assembly is a device that is mounted on a water purifier or a refrigerator and filters water through one or more water filters, so as to supply clean water to a user. The filter assembly may include a plurality of filters to implement a water purification performance.

At this time, the plurality of filters is arranged to allow water passing through the filter to flow with a certain direction.

The plurality of filters may be provided with different types of filters. When the filter is incorrectly assembled due to user's carelessness upon replacing the filter, internal leakage may occur or overall water purification performance may be reduced.

SUMMARY

Aspects of embodiments of the disclosure will be set forth in part in the description which follows and, in part, will be apparent from the description, or may be learned by practice of the presented embodiments.

According to an embodiment of the disclosure, a water purifying filter assembly may include a filter case including a receiving member having a protrusion; and a head assembly. The protrusion may be configured to be receivable in a recessed portion on an outer circumferential surface of a filter so that when the filter is placed in the receiving member with the protrusion received in the recessed portion, the filter is fixedly couplable to the head assembly by rotation of the filter, and when the filter is placed in the receiving member with the protrusion not received in the recessed portion, the filter is prevented from being fixedly couplable to the head assembly.

According to an embodiment of the disclosure, the receiving member is a first receiving member, and the water purifying filter assembly further includes a second receiving member including a protrusion shaped differently than the protrusion of the first receiving member, wherein, when a first filter having a recessed portion configured to receive the protrusion of the first receiving member is inserted into the second receiving member, coupling of the first filter to the head assembly is prevented by the protrusion of the second receiving member, and when a second filter having a recessed portion configured to receive the protrusion of the second receiving member is inserted into the first receiving member, coupling of the second filter to the head assembly is prevented by the protrusion of the first receiving member.

According to an embodiment of the disclosure, the recessed portion of the filter is adjacent to the head assembly when the filter is placed in the receiving member.

According to an embodiment of the disclosure, the receiving member is a first receiving member, and the water purifying filter assembly further includes a second receiving member including a protrusion having a same shape as the protrusion of the first receiving member, the protrusion of the second receiving member being arranged at a position relative to the second receiving member that is different from a position of the protrusion of the first receiving member relative to the first receiving member.

According to an embodiment of the disclosure, the water purifying filter assembly further includes the filter, wherein the filter is provided with a pair of the recessed portions arranged symmetrically with respect to a longitudinal center of the filter.

According to an embodiment of the disclosure, the receiving member further includes a peripheral member extending radially inwardly from an inner circumferential surface of the receiving member, wherein the protrusion extends away from the peripheral member, and the protrusion extends further inward than the peripheral member from the inner circumferential surface.

According to an embodiment of the disclosure, the receiving member further includes a peripheral member extending radially inwardly from an inner circumferential surface of the receiving member, wherein the protrusion extends away from the peripheral member, and the protrusion extends further along a longitudinal direction of the receiving member than the peripheral member.

According to an embodiment of the disclosure, the head assembly includes a mounting member coupled to the filter case and couplable to the filter, wherein the mounting member is configured to engage with a mounting protrusion protruding radially outward from an inlet and outlet member of the filter so that the mounting protrusion of the filter is coupled to an inside of the mounting member when the protrusion of the receiving member is received in the recessed portion and the filter is rotated.

According to an embodiment of the disclosure, the water purifying filter assembly further includes a cover member coupled to the filter case at a side of the filter case opposite to the head assembly and configured to open to receive the filter as the filter is being placed in the receiving member, and to close to cover a handle of the filter when the filter is fixedly coupled to the head assembly.

According to an embodiment of the disclosure, the cover member includes an inner bracket including a receiving hole through which the filter passes as the filter is being placed in the receiving member; and an outer bracket coupled to the inner bracket so as to open and close the receiving hole from outside of the inner bracket.

According to an embodiment of the disclosure, the outer bracket includes a door block extending from an inner surface toward the handle and configured so that when the filter is fixedly coupled to the head assembly, the outer bracket is closable, and when the filter is incorrectly received in the receiving member, the door block interferes with the handle so that the outer bracket is not closable.

According to an embodiment of the disclosure, the receiving member is a first receiving member, and the water purifying filter assembly further includes a second receiving member arranged adjacent to the first receiving member and in a first direction away from the first receiving member; and a third receiving member arranged adjacent to the first receiving member and in a second direction away from the first receiving member.

According to an embodiment of the disclosure, each of the first, second, and third receiving members have differently configured protrusions that are respectfully receivable in differently configured recessed portions of different filters.

According to an embodiment of the disclosure, the water purifying filter assembly further includes an interference rib mounted on the filter case and protruding inward from an inner circumferential surface of the receiving member, wherein the interference rib is configured so that, the interference rib engages with a guide groove formed on an outer circumferential surface of a filter to guide proper placement of the filter in the receiving member, and the interference rib is pressed outward during insertion of the filter into the receiving member when the guide groove engaged with the interference rib is formed to be inclined with respect to a direction in which the filter is inserted into the filter case.

According to an embodiment of the disclosure, the filter case includes a cutout configured to allow the interference rib to protrude into the filter case. According to an embodiment of the disclosure, the water purifying filter assembly further includes the filter.

Additional embodiments of the disclosure will be set forth in part in the description which follows and, in part, will be obvious from the description, or will be apparent from the disclosure.

BRIEF DESCRIPTION OF THE DRAWINGS

These and/or other embodiments of the disclosure will become apparent and more readily appreciated from the following description of the embodiments, taken in conjunction with the accompanying drawings of which.

DETAILED DESCRIPTION

Figure 1:
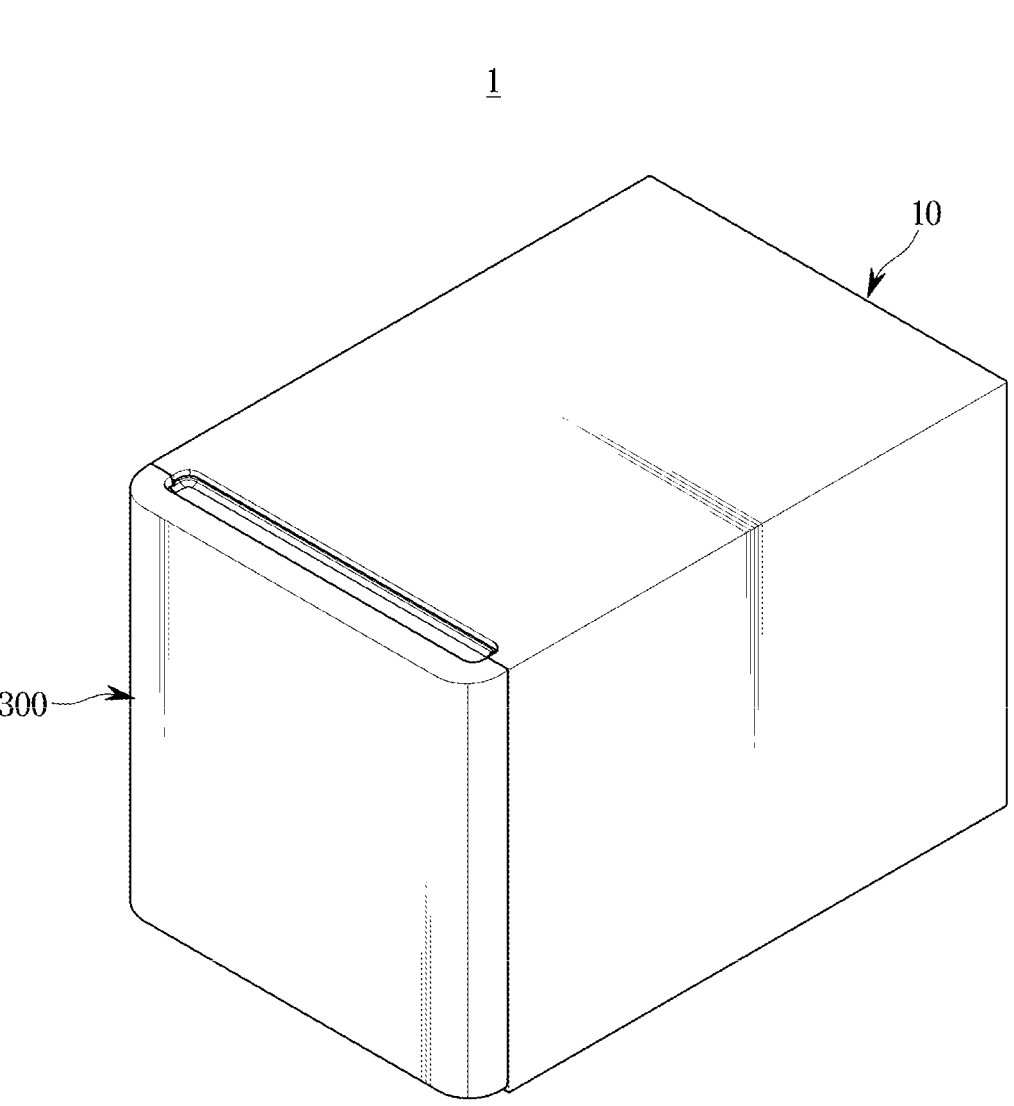
FIG. 1 is a perspective view illustrating a main configuration of a water purifying filter assembly according to an embodiment of the disclosure.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise.

In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element.

For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front", "rear", "upper portion", "lower portion" and the like may be defined by the drawings, but the shape and the location of the component is not limited by the term.

Hereinafter example embodiments of the present disclosure will be described particularly with reference to the accompanying drawings.

Figure 2:
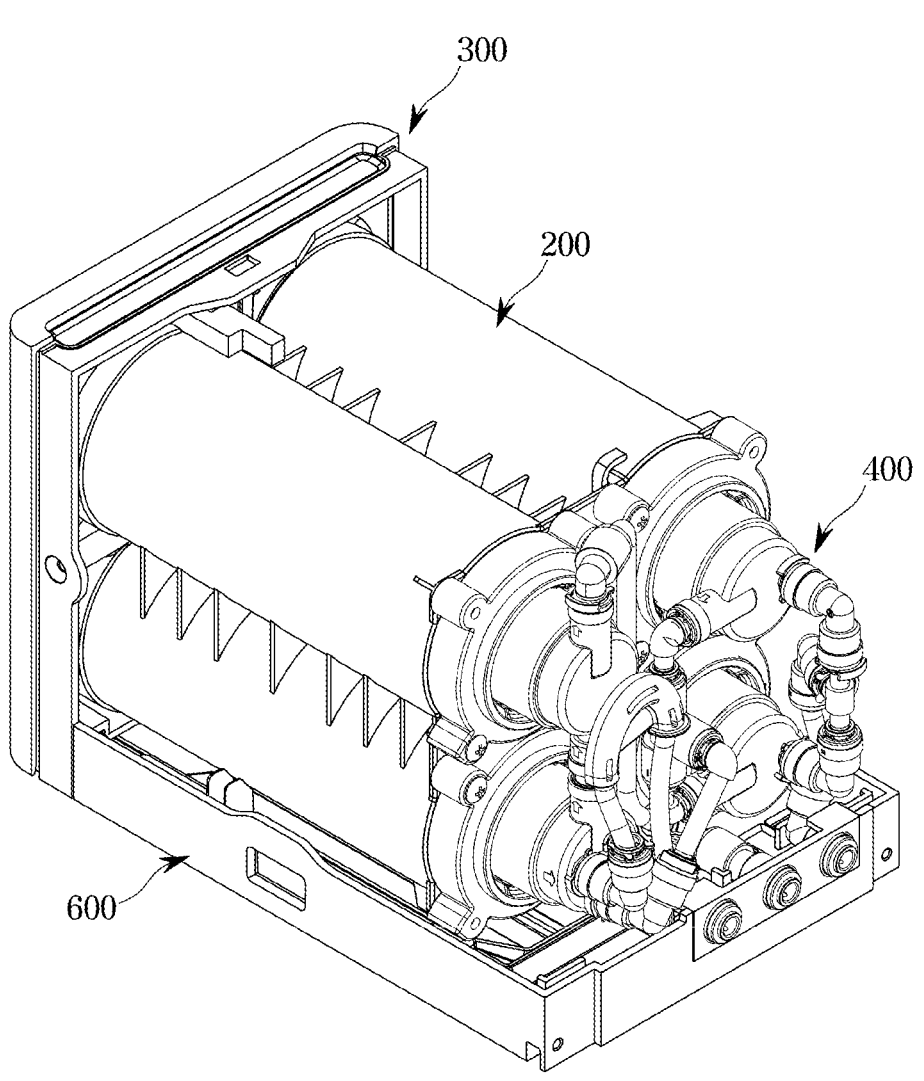
FIG. 2 is a perspective view illustrating a configuration in which a frame is removed from FIG. 1 according to an embodiment of the disclosure.
Figure 3:
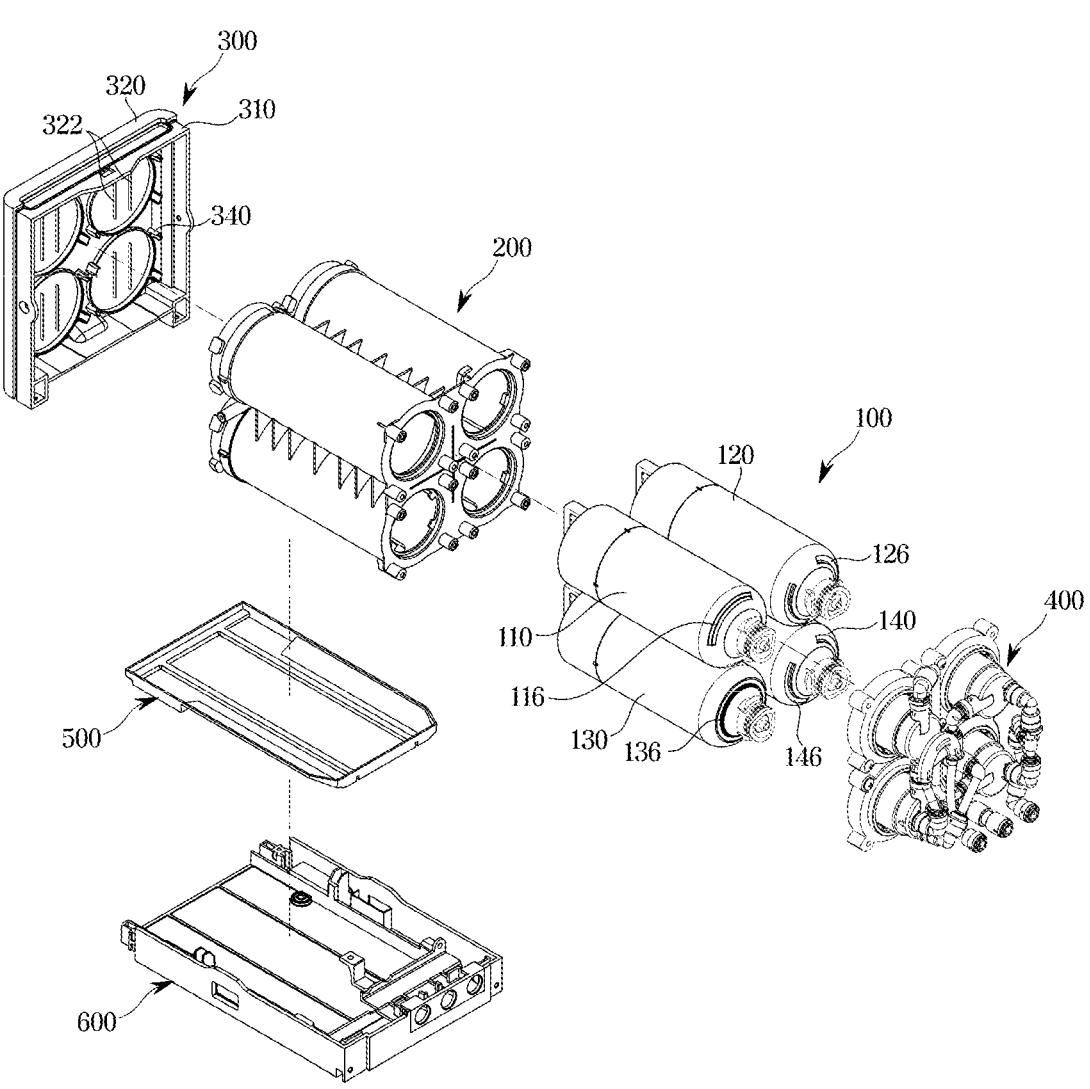
FIG. 3 is an exploded perspective view illustrating components shown in FIG. 2 according to an embodiment of the disclosure.

FIG. 1 is a perspective view illustrating a main configuration of a water purifying filter assembly according to one embodiment of the present disclosure. FIG. 2 is a perspective view illustrating a configuration in which a frame is removed from FIG. 1. FIG. 3 is an exploded perspective view illustrating components shown in FIG. 2.

Referring to FIG. 1, a water purifying filter assembly 1 may include a frame 10 to accommodate a plurality of filters 100 and a filter case 200. The water purifying filter assembly 1 may include a cover member 300 mounted on one side of the frame 10.

The plurality of filters 100 configured to filter raw water may be centrally disposed between the frame 10 and the cover member 300. A user can replace the plurality of filters 100 through the cover member 300. Details related to this will be described later.

Referring to FIGS. 1 to 3, the water purifying filter assembly 1 may include the filter case 200 disposed inside the frame 10.

The filter case 200 may be engaged with the cover member 300 to allow the plurality of filters 100 to be separately accommodated therein. The plurality of filters 100 may be disposed adjacent to each other through the filter case 200. That is, because the filter is compactly arranged, a size of the water purifier 1 may be reduced. In addition, it may be provided for a user to easily withdraw or insert the plurality of filters 100. The plurality of filters 100 may be provided to be inserted into or withdrawn from the filter case 200.

The cover member 300 may include an inner bracket 310 and an outer bracket 320. The cover member 300 may be connected to the filter case 200 to fix the filter to prevent the filter from moving.

The inner bracket 310 and the outer bracket 320 may each include a groove for a handle. In addition, a plurality of fixing pins 340 may be provided on the inner bracket 310 to support the filter case 200 against the cover member 300 without the movement of the filter case 200. The inner bracket 310 may include circular spaces according to a shape of the filter. Accordingly, a user can access the filter through the circular space.

The water purifying filter assembly 1 may include a head assembly 400 mounted on one side of the filter case 200.

The head assembly 400 may be coupled to the plurality of filters 100 to form a flow path, which connects the plurality of filters 100, to allow water introduced from an outside to pass through each filter. The plurality of filters 100 may be rotationally coupled to the head assembly 400.

That is, the head assembly 400 may be coupled to each of the plurality of filters 100 and may also be coupled to the filter case 200 surrounding the plurality of filters 100.

The water purifying filter assembly 1 may include a drip tray 500.

When the water purifying filter assembly 1 is used for a long time, water flowing through the flow path may leak. Further, a leak may occur when replacing the filter. In this case, the leaking water may be collected in the drip tray 500. The water collected in the drip tray 500 may be removed in such a way that a user can remove the water by withdrawing only the drip tray 500 after opening the water purifying filter assembly 1.

The water purifying filter assembly 1 may include a support plate 600 arranged under the drip tray 500.

The support plate 600 may be mounted on the cover member 300 to support the filter case 200 and the head assembly 400 as well as the drip tray 500.

The support plate 600 may include a plurality of holes connecting a pipe 430 (shown in FIG. 4) formed in the head assembly 400, to the outside. The plurality of holes may include an inlet hole through which raw water is introduced, an outlet hole through which purified water is discharged, and a drain hole through which washing water is discharged. However, the number of the plurality of holes is not limited thereto.

The water purifying filter assembly 1 according to one embodiment of the present disclosure may be provided in a refrigerator, and may be disposed inside the refrigerator to allow purified water to be supplied from a refrigerator dispenser. However, the present disclosure is not limited thereto and the water purifying filter assembly may be disposed outside the refrigerator to supply purified water. Alternatively, the water purifying filter assembly 1 may be provided in a water purifier. That is, the water purifying filter assembly 1 according to one embodiment of the present disclosure may be disposed anywhere for the purpose of purifying water.

Figure 4:
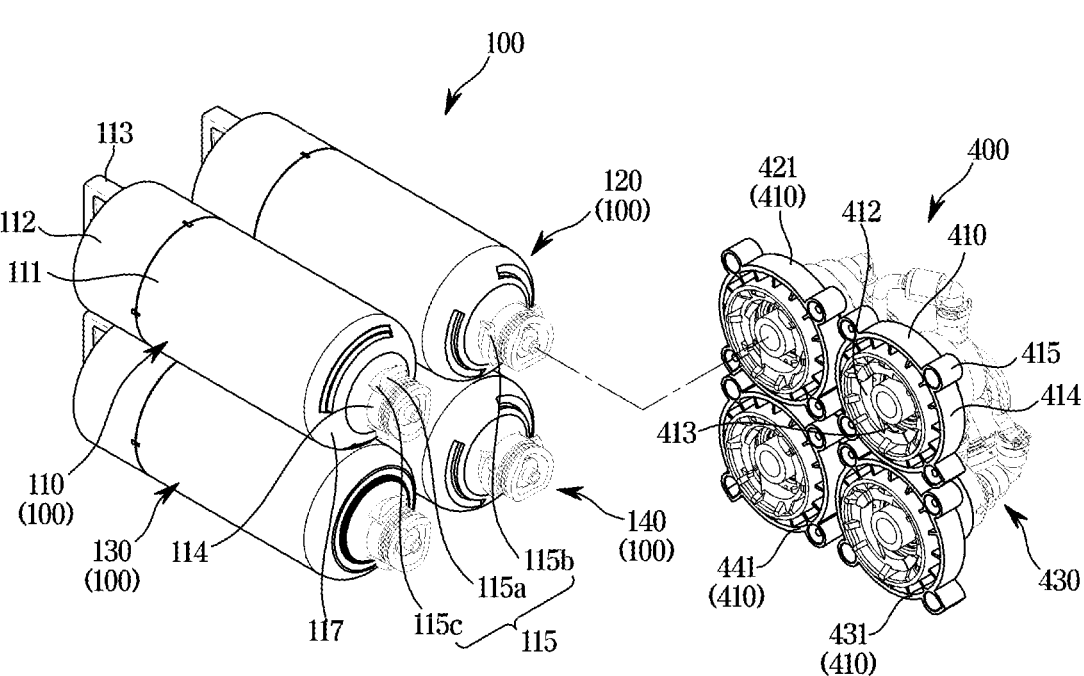
FIG. 4 is a perspective view illustrating a coupling relationship between a plurality of filters and a head assembly of the water purifying filter assembly according to an embodiment of the disclosure.

FIG. 4 is a perspective view illustrating a coupling relationship between a plurality of filters and a head assembly of the water purifying filter assembly according to one embodiment of the present disclosure.

Referring to FIG. 4, the plurality of filters 100 may include a first filter 110, a second filter 120, a third filter 130, and a fourth filter 140.

The first filter 110 and the second filter 120 may be arranged side by side in a first direction. The first filter 110 and the third filter 130 may be arranged side by side in a second direction perpendicular to the first direction. In addition, the fourth filter 140 and the second filter 120 may be arranged side by side in the second direction. However, the arrangement of the filter is not limited thereto. It should be understood that the shapes of the filter case 200 and the head assembly 400 for receiving the filter may be changed according to the change in the arrangement of the filter.

The plurality of filters 100 may be provided in the same shape except for a recessed portion formed therein. The plurality of filters 100 may be provided in a substantially cylindrical shape. However, the shape of the filter is not limited thereto.

A detailed configuration of the plurality of filters 100 having the same shape will be described using the first filter 110 as an example.

The first filter 110 may include a first housing 111 and a second housing 112.

The first housing 111 may be approximately formed as an upper housing of the first filter 110, and the second housing 112 may be formed as a lower housing of the first filter 110.

The first filter 110 may include a handle 113 formed on one side of the second housing 112. Particularly, the handle 113 may be formed on a bottom surface of the first filter 110. When a user replaces the filter, the handle 113 is provided to be gripped by the user. In addition, the handle 113 also serves as an indicator that indicates whether the filter is coupled to the head assembly 400 in a correct position, to the outside. Details related to this will be described later.

The first filter 110 may include an inlet and outlet member 114 including an opening through which water passes. Particularly, the inlet and outlet member 114 may be formed in the first housing 111.

The first filter 110 may include a mounting protrusion 115 protruding radially outward from the inlet and outlet member 114. The mounting protrusion 115 may include a first member 115a, a second member 115b, and a third member 115c. The first member 115a extends in a radial direction of the filter from the inlet and outlet member 114. The first member 115a may be formed as a flat surface. The second member 115b may extend in a circumferential direction from the first member 115a and may be formed as an inclined surface. The third member 115c may extend in the radial direction of the filter from the inlet and outlet member 114, but may extend to protrude less than the first member 115a and the second member 115b. The mounting protrusion 115 may be mounted on a mounting protrusion insertion member 413 by moving a guide 412 of the head assembly 400 to be described later.

The above configuration may be equally applied to the second filter 120, the third filter 130, and the fourth filter 140.

The head assembly 400 may include a mounting member 410 and a pipe member 430.

The mounting member 410 is provided to be coupled to the plurality of filters 100 and the filter case 200.

The mounting member 410 may include a first mounting member 411, a second mounting member 421, a third mounting member 431, and a fourth mounting member 441. The first mounting member 411 may be coupled to the first filter 110. The second mounting member 421 may be coupled to the second filter 120. The third mounting member 431 may be coupled to the third filter 130, and the fourth mounting member 441 may be coupled to the fourth filter 140.

The mounting member 410 may include an annular rib 414 connected to each of the first to fourth mounting members 411, 421, 431, and 441, to which the plurality of filters 100 is coupled, so as to be coupled to the filter case 200. A coupler 415 to which a coupling protrusion 221 (shown in FIG. 6) of the filter case 200 is inserted and coupled may be provided in plurality on an outside of the annular rib 414.

Because the mounting protrusion 115 of the first filter 110 is described above, the mounting member 410 will be described in detail using the first mounting member 411 as an example.

The first mounting member 411 of the head assembly 400 may include the guide 412 and the mounting protrusion insertion member 413. The guide 412 and the mounting protrusion insertion member 413 may be coupled to the mounting protrusion 115 radially protruding from the inlet and outlet member 114 of the first filter 110.

Particularly, the guide 412 may be inclined from an inner side of the mounting member 410 toward the pipe 430 to allow the mounting protrusion 115 of the first filter 110 to be rotated and coupled to an inner side of the head assembly 400 in response to the mounting protrusion 115 being inserted into the head assembly 400.

The mounting protrusion insertion member 413 may be formed as a flat surface along a radial direction of the mounting member 410 to allow the mounting protrusion 115, which is guided to rotate along the guide 412, to be inserted thereto.

Because the guide 412 protrudes further inward in the radial direction of the mounting member 410 than the mounting protrusion insertion member 413, the guide 412 and the mounting protrusion insertion member 413 may be provided in a shape having a step difference.

The above configuration may be equally applied to the second mounting member 421, the third mounting member 431, and the fourth mounting member 441.

Hereinafter it will be described that the mounting protrusion 115 of the first filter 110 is mounted on the first mounting member 411.

The first member 115a of the mounting protrusion 115 of the first filter 110 may be rotated and pass through the guide 412 of the first mounting member 411 and then mounted on the mounting protrusion insertion member 413. Because the second member 115b includes an inclined surface, a surface passing through the guide 412 may be the second member 115b of the mounting protrusion 115.

In response to the first filter 110 being coupled to the first mounting member 411 in a correct position, the third member 115c of the mounting protrusion 115 is in contact with the guide 412. Accordingly, the first member 115a and the second member 115b of the mounting protrusion 115 are positioned at the mounting protrusion insertion member 413.

The first filter 110 may be coupled to the first mounting member 411 in the correct position after rotation of approximately 90 degrees based on a moment in which the first filter 110 is inserted into the first mounting member 411.

Figure 5:
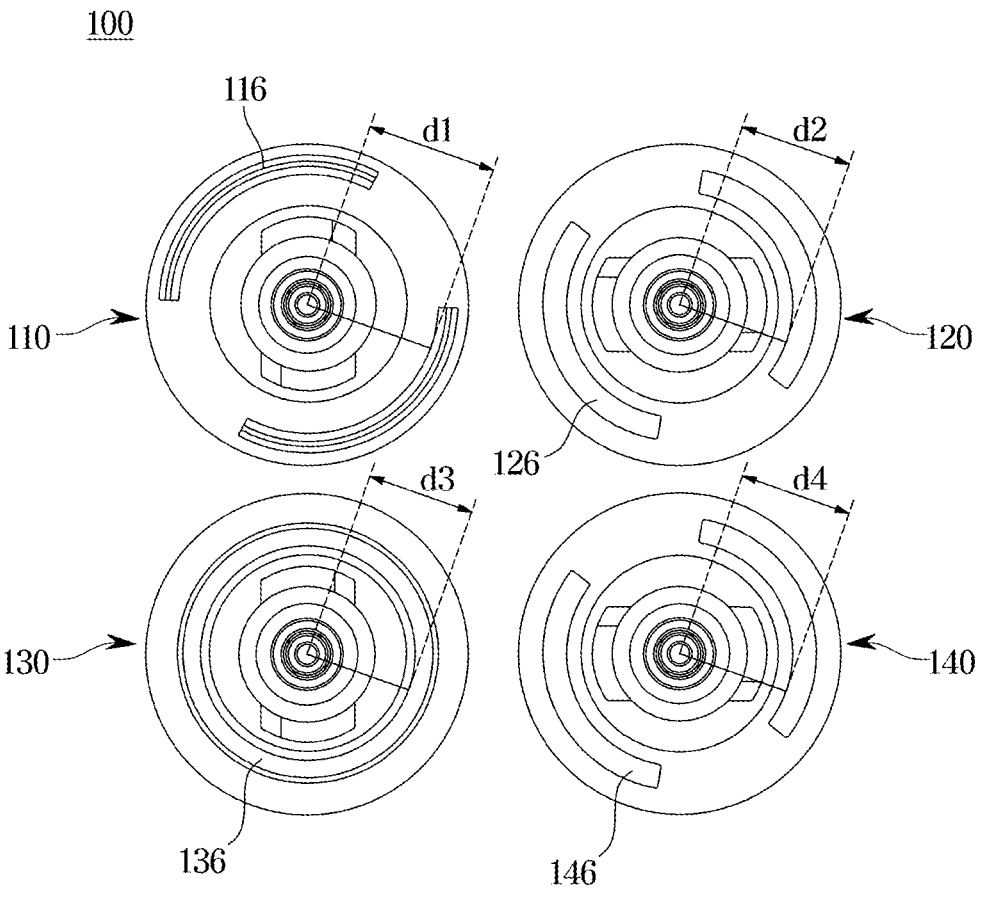
FIG. 5 is a front view illustrating filters according to an embodiment of the disclosure.
Figure 6:
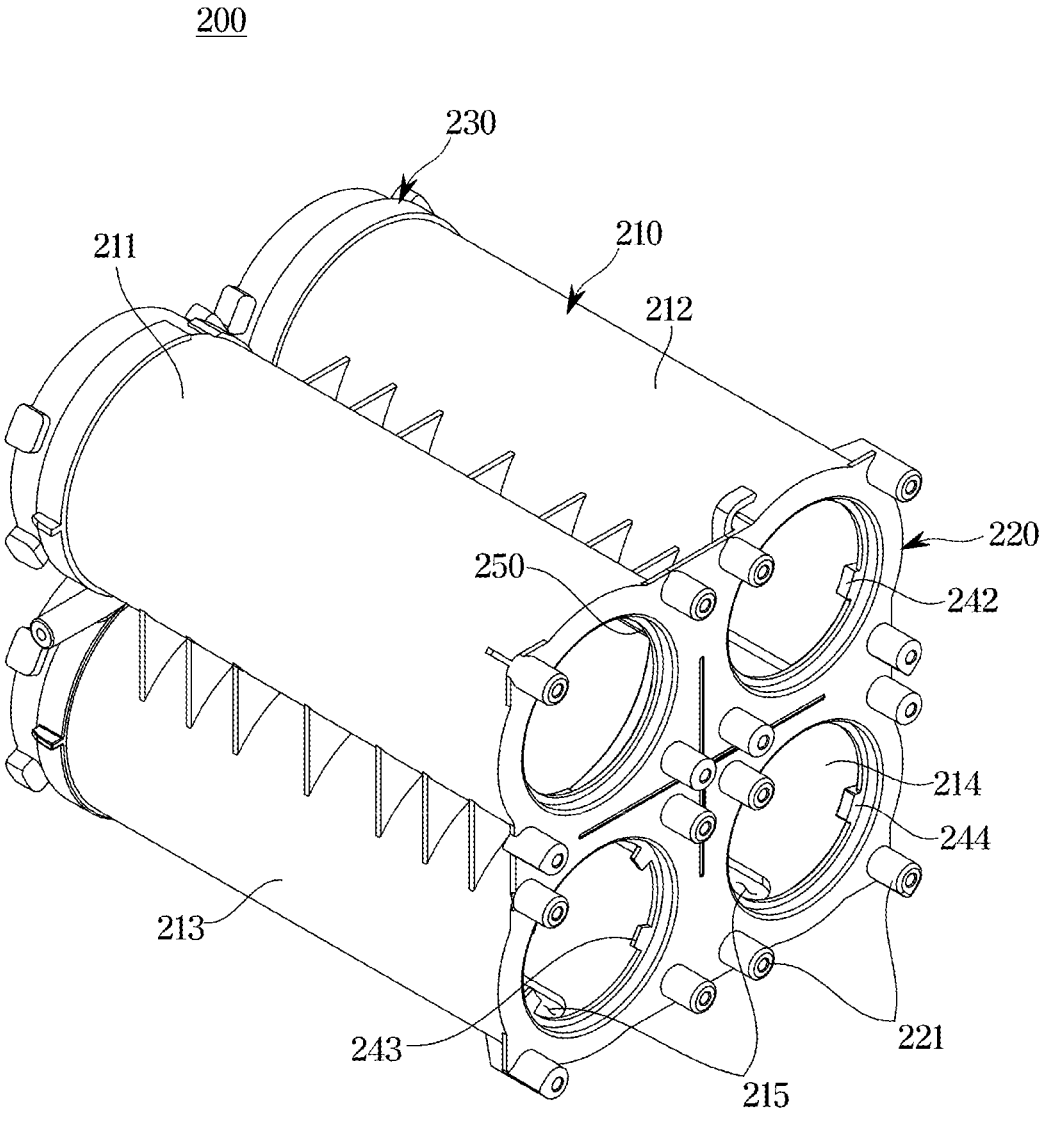
FIG. 6 is a perspective view illustrating a filter case of the water purifying filter assembly according to an embodiment of the disclosure.
Figure 7:
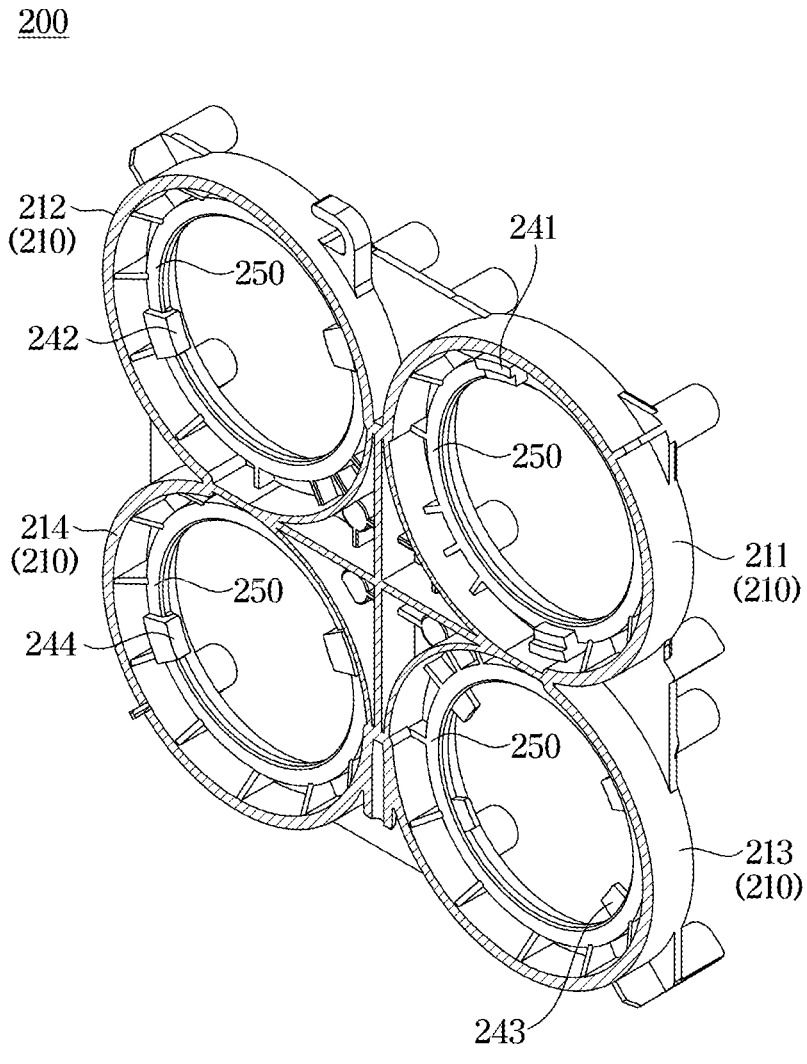
FIG. 7 is a partial perspective view illustrating a part of the filter case of FIG. 6 as viewed from a rear side according to an embodiment of the disclosure.

FIG. 5 is a front view illustrating filters according to one embodiment of the present disclosure. FIG. 6 is a perspective view illustrating a filter case of the water purifying filter assembly according to one embodiment of the present disclosure. FIG. 7 is a partial perspective view illustrating a part of the filter case of FIG. 6 as viewed from a rear side.

Referring to FIG. 5, each of the plurality of filters 100 may include the recessed portion. Each of the recessed portions may be formed in a shape and a position corresponding to each of the protrusions of the filter case 200 to be described later.

The first filter 110 may include a first recessed portion 116. The second filter 120 may include a second recessed portion 126. The third filter 130 may include a third recessed portion 136. In addition, the fourth filter 140 may include a fourth recessed portion 146.

Hereinafter the first recessed portion 116 formed in the first filter 110 will be described as an example. The first recessed portion 116 may be recessed inward along a rotation direction of the first filter 110. That is, the first recessed portion 116 may be formed along a circumferential direction of the first filter 110.

The first recessed portion 116 may be provided as a pair symmetrical with respect to a center C of the first filter 110.

However, the present disclosure is not limited thereto, and the first recessed portion 116 may vary as long as the first recessed portion 116 does not interfere with a first protrusion 241 to be described later.

In addition, a position in which the first recessed portion 116 is formed may be formed in a front portion of the first filter 110 with respect to a direction in which the first filter 110 is inserted.

However, the present disclosure is not limited thereto, and the first recessed portion 116 may be formed on a side surface or a rear portion of the first filter 110. It should be understood that a position of the protrusion of the filter case 200 may be changed according to the change in the position of the first recessed portion 116.

The second recessed portion 126, the third recessed portion 136, and the fourth recessed portion 146 may also be formed in the same manner as the above-described first recessed portion 116.

At a position away from the center C of the first filter 110 by a first radius d1, the first recessed portion 116 may be recessed inward the first filter 110.

At a position away from the center C of the second filter 120 by a second radius d2, the second recessed portion 126 may be recessed inward the second filter 120.

At a position away from the center C of the third filter 130 by a third radius d3, the third recessed portion 136 may be recessed inward the third filter 130.

At a position away from the center C of the fourth filter 140 by a fourth radius d4, the fourth recessed portion 146 may be recessed inward the fourth filter 140.

In the embodiment, the first radius d1 is greater than the second radius d2, and the second radius d2 is greater than the third radius d3. The second radius d2 may be the same as the fourth radius d4.

Because the respective recessed portions are formed at different starting positions, the protrusion of the filter case 200, which will be described later, may also have different shapes. Accordingly, it is possible to prevent an incorrect assembly by identifying a coupling position according to the type of filter.

However, the relationship between the first radius d1 and the fourth radius d4 is not limited thereto.

In the embodiment, it is described that that the second filter 120 and the fourth filter 140 are provided with the same type of composite filter, and the second recessed portion 126 formed in the second filter 120 is the same as the fourth recessed portion 146 formed in the fourth filter 140. However, the present disclosure is not limited thereto, and each filter may be provided as a different type of filter, and accordingly, each recessed portion may also be formed in a different shape or in a different position.

The plurality of protrusions formed in the filter case 200 and a plurality of receiving members 210 will be described with reference to FIGS. 6 and 7.

The filter case 200 may include the receiving member 210.

The filter case 200 may include a first receiving member 211 receiving the first filter 110, a second receiving member 212 receiving the second filter 120, a third receiving member 213 receiving the third filter 130, and a fourth receiving member 214 receiving the fourth filter 140.

The first filter 110 may be inserted into or withdrawn from the first receiving member 211. The first receiving member 211 may include the first protrusion 241 (refer to FIG. 7) provided in a shape corresponding to the first recessed portion 116 of the first filter 110.

The first receiving member 211 may include a peripheral member 250 extending radially inwardly from an inner circumferential surface of the first receiving member 211.

The second filter 120 may be inserted into or withdrawn from the second receiving member 212. The second receiving member 212 may include a second protrusion 242 provided in a shape corresponding to the second recessed portion 126 of the second filter 120.

The third filter 130 may be inserted into or withdrawn from the third receiving member 213. The third receiving member 213 may include a third protrusion 243 provided in a shape corresponding to the third recessed portion 136 of the third filter 130.

The fourth filter 140 may be inserted into or withdrawn from the fourth receiving member 214. The fourth receiving member 214 may include a fourth protrusion 244 provided in a shape corresponding to the fourth recessed portion 146 of the fourth filter 140.

In the embodiment, it is described that two first, second, and fourth protrusions 241, 242, and 244 are provided for each receiving member 210, and four third protrusions 243 are provided, but the number of each protrusion is not limited thereto.

In addition, the filter case 200 may include a residual water hole 215 at a bottom. Water leaking through the residual water hole 215 may be moved and collected in the drip tray 500.

The filter case 200 may include a head mounting member 220.

The head mounting member 220 may be connected to the receiving member 210 and provided on one side of the filter case 200. The head mounting member 220 may include a plurality of coupling protrusions 221 to connect the head assembly 400 and the filter case 200. In addition, the head mounting member 220 may be integrally formed with the receiving member 210.

The plurality of coupling protrusions 221 may extend from the head mounting member 220 toward the head assembly 400 in a longitudinal direction of the filter. In FIG. 6, a total of 16 coupling protrusions 221 are illustrated, but the number and shape thereof may not be limited thereto.

The filter case 200 may include a cover member coupler 230.

The cover member coupler 230 may be provided on the other side of the filter case 200 so as to connect the cover member 300 to the filter case 200. The cover member coupler 230 is received in the inner bracket 310 to allow the filter case 200 to be coupled to the cover member 300.

In the embodiment, it is described that that the second filter 120 and the fourth filter 140 are provided with the same type of composite filter, and the second protrusion 242 formed in the second receiving member 212 is the same as the fourth protrusion 244 formed in the fourth receiving member 214. However, the present disclosure is not limited thereto, and each filter may be provided as a different type of filter, and accordingly, each protrusion may also be formed in a different shape or in a different position.

In addition, FIG. 7 illustrates a part of the filter case 200, but the part shown in FIG. 7 may be provided as a component separated from the filter case 200 and then coupled to the filter case 200.

Figure 8:
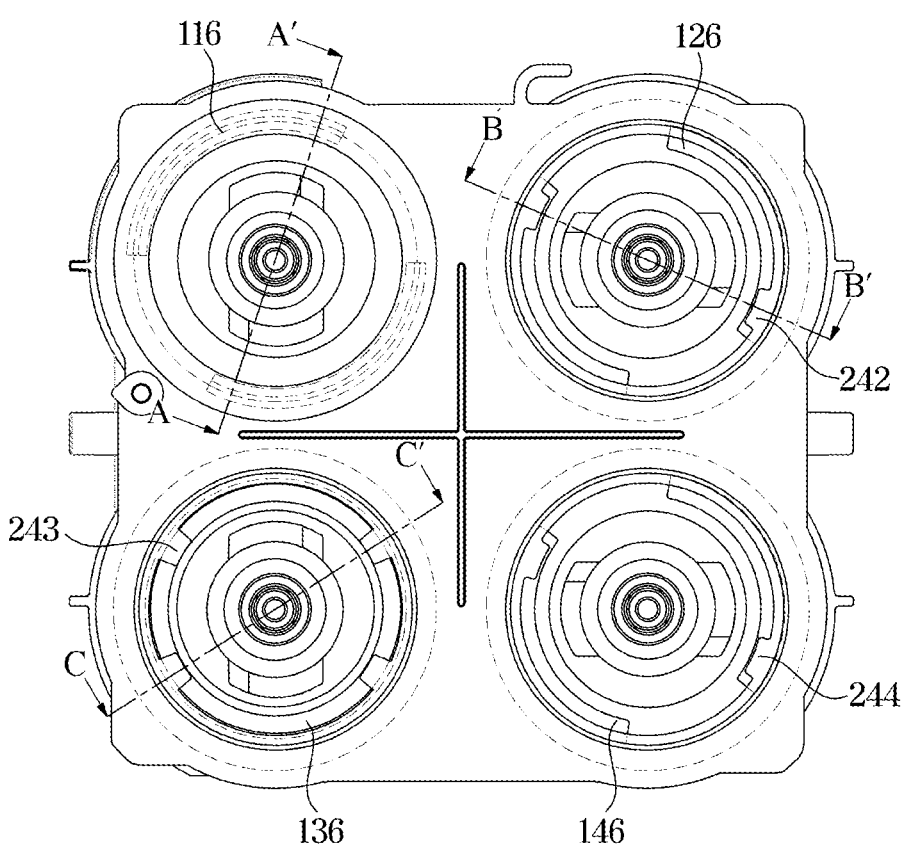
FIG. 8 is a front view illustrating the filter and the filter case of the water purifying filter assembly according to an embodiment of the disclosure.
Figure 9:
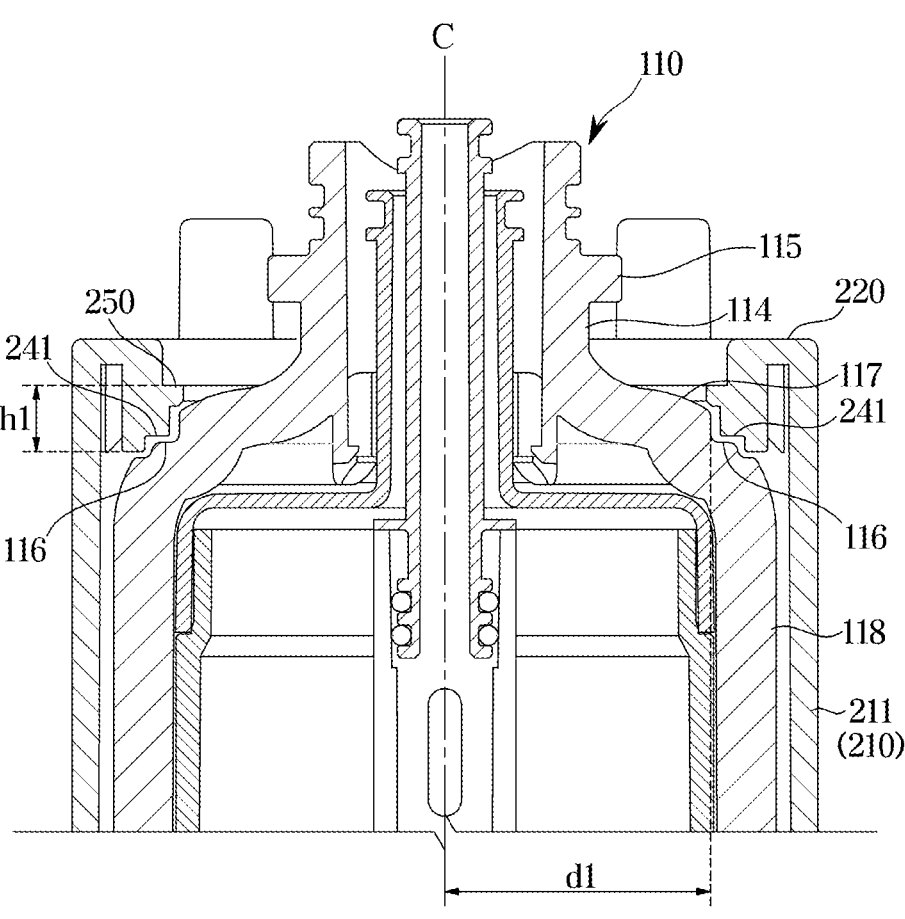
FIG. 9 is a cross-sectional view taken along a line A-A" of FIG. 8 according to an embodiment of the disclosure.
Figure 10:
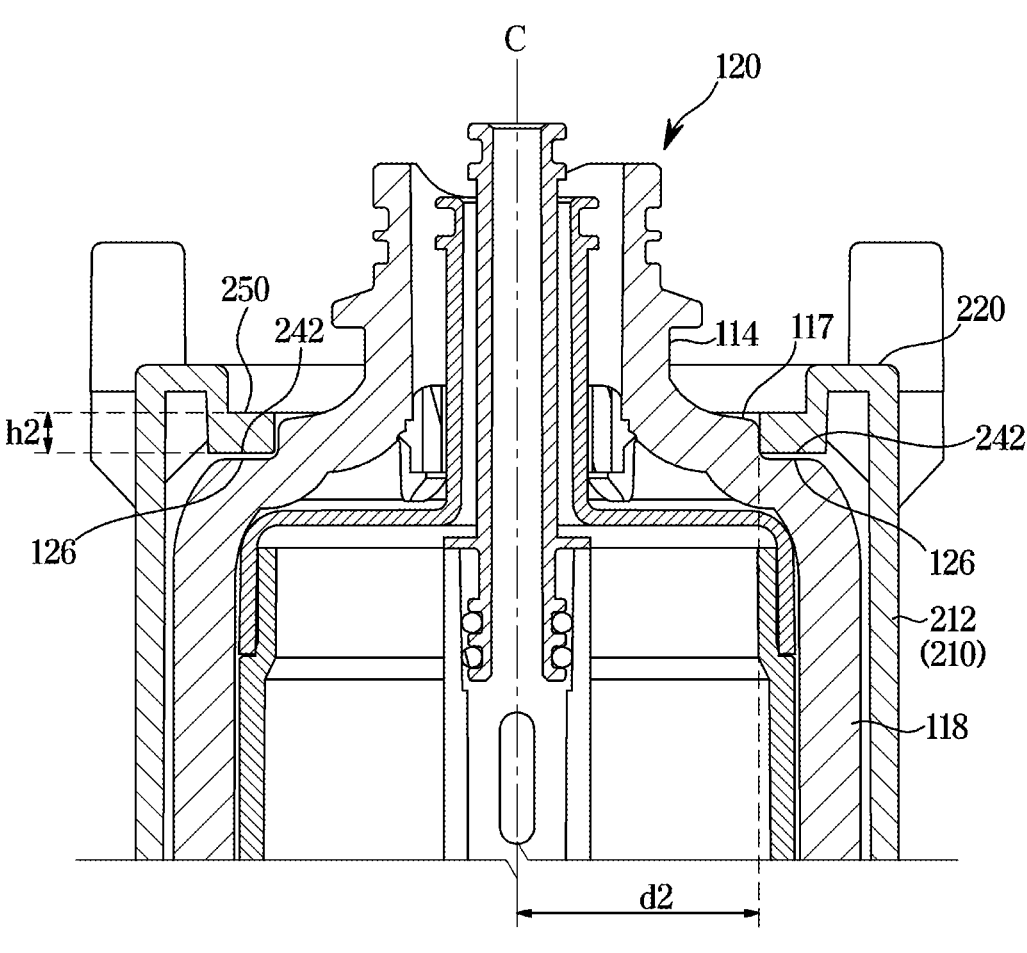
FIG. 10 is a cross-sectional view taken along a line B-B' of FIG. 8 according to an embodiment of the disclosure.
Figure 11:
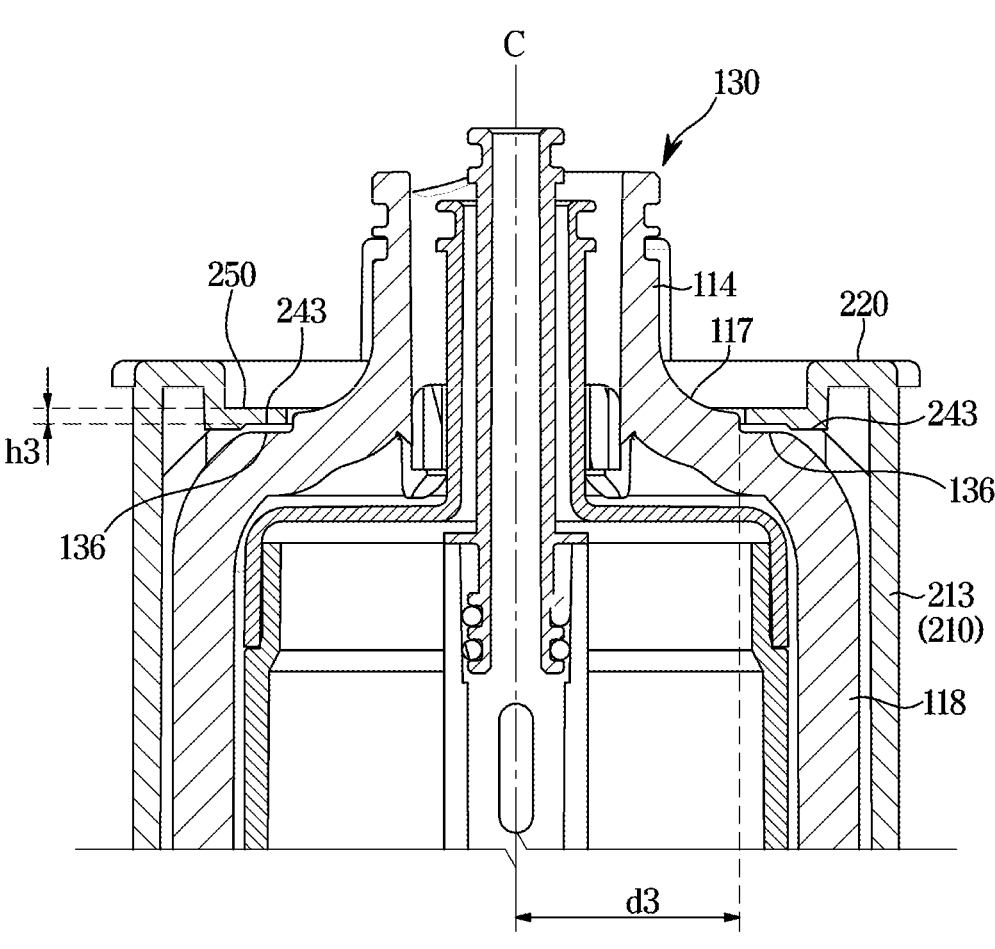
FIG. 11 is a cross-sectional view taken along a line C-C' of FIG. 8 according to an embodiment of the disclosure.

FIG. 8 is a front view illustrating the filter and the filter case of the water purifying filter assembly according to one embodiment of the present disclosure. FIG. 9 is a cross-sectional view taken along a line A-A' of FIG. 8. FIG. 10 is a cross-sectional view taken along a line B-B' of FIG. 8. FIG. 11 is a cross-sectional view taken along a line C-C' of FIG. 8.

A relationship between the recessed portion formed in a different shape in each filter and the protrusion formed in the filter case 200 will be described with reference to FIGS. 8 to 11. The second filter 120 and the fourth filter 140 are the same type of filter, and the drawing and description of the fourth filter 140 are the same as those of the second filter 120.

Referring to FIGS. 8 and 9, the first filter 110 may be provided to be received in the first receiving member 211.

The first filter 110 may include a filter body provided inside the housing to filter out impurities in the raw water.

The first filter 110 may include the inlet and outlet member 114 and a vertical member 118 extending in the longitudinal direction of the first filter 110. In addition, the first filter 110 may include an inclined member 117 provided to connect the inlet and outlet member 114 to the vertical member 118.

The first recessed portion 116 may be formed in the inclined member 117 of the first filter 110. The first recessed portion 116 may be formed by being recessed from the outside to the inside of the first filter 110 to have two steps. The first recessed portion 116 may be recessed from a position away from the center C of the first filter 110 by the first radius d1.

The filter case 200 may include the first protrusion 241 formed in the first receiving member 211.

An inner circumferential surface of the filter case 200 may partially extend from the head mounting member 220 toward the longitudinal direction of the first filter 110. In addition, the filter case 200 may include the peripheral member 250 extending radially inward from the inner circumferential surface.

The first protrusion 241 may extend along the longitudinal direction of the first filter 110. The first protrusion 241 may be provided to extend further in the longitudinal direction than the peripheral member 250. That is, a height from an upper surface of the peripheral member 250 to a lowest surface of the first protrusion 241 may be referred to as a first height h1, and the first height h1 may be greater than a thickness of the peripheral member 250.

In response to the first recessed portion 116 being recessed at a position away from the center C of the first filter 110 by the first radius d1, the first protrusion 241 may protrude from the inner circumferential surface at a position away from the center C by the first radius d1 or at a position away from the center C by a distance greater than the first radius d1.

Referring to FIGS. 8 and 10, the second filter 120 may be provided to be received in the second receiving member 212.

The second filter 120 may include an inlet and outlet member 114 and a vertical member 118 extending in a longitudinal direction of the second filter 120. In addition, the second filter 120 may include an inclined member 117 provided to connect the inlet and outlet member 114 to the vertical member 118.

The second recessed portion 126 may be formed in the inclined member 117 of the second filter 120. The second recessed portion 126 may be formed by being recessed from the outside to the inside of the second filter 120 to have a step difference. The second recessed portion 126 may be recessed from a position away from the center C of the second filter 120 by the second radius d2.

The filter case 200 may include a second protrusion 242 formed in the second receiving member 212.

The inner circumferential surface of the filter case 200 may partially extend from the head mounting member 220 toward the longitudinal direction of the second filter 120.

The second protrusion 242 may extend radially inwardly from the inner circumferential surface. The second protrusion 242 may be provided to extend more inward than the peripheral member 250.

A height from the upper surface of the peripheral member 250 to the lowest surface of the second protrusion 242 may be referred to as a second height h2, and the second height h2 may be formed to be greater than the thickness of the peripheral member 250.

In response to the second recessed portion 126 being recessed at a position away from the center C of the second filter 120 by the second radius d2, the second protrusion 242 may protrude from the inner circumferential surface at a position away from the center C by the second radius d2 or at a position away from the center C by a distance greater than the second radius d2.

Referring to FIGS. 8 and 11, the third filter 130 may be provided to be received in the third receiving member 213.

The third filter 130 may include an inlet and outlet member 114 and a vertical member 118 extending in the longitudinal direction of the second filter 120. In addition, the third filter 130 may include an inclined member 117 provided to connect the inlet and outlet member 114 to the vertical member 118.

The third recessed portion 136 may be formed in the inclined member 117 of the third filter 130. The third recessed portion 136 may be formed by being recessed from the outside to the inside of the third filter 130 to have a step difference. The third recessed portion 136 may be recessed from a position away from the center C of the third filter 130 by the third radius d3.

The filter case 200 may include a third protrusion 243 formed in the third receiving member 213.

The inner circumferential surface of the filter case 200 may partially extend from the head mounting member 220 toward a longitudinal direction of the third filter 130.

The third protrusion 243 may extend radially inwardly from the inner circumferential surface. The third protrusion 243 may be provided to extend more inward than the peripheral member 250.

A height from the upper surface of the peripheral member 250 to the lowest surface of the third protrusion 243 may be referred to as a third height h3, and the third height h3 may be formed to be less than the thickness of the peripheral member 250.

In response to the third recessed portion 136 being recessed at a position away from the center C of the third filter 130 by the third radius d3, the third protrusion 243 may protrude from the inner circumferential surface at a position away from the center C by the third radius d3 or at a position away from the center C by a distance greater than the third radius d3.

Therefore, as shown in FIGS. 9 to 11, the first recessed portion 116, the second recessed portion 126, and the third recessed portion 136 are formed to have different distances that is apart from the center C of the filter. That is, the first radius d1 is formed to be greater than the second radius d2, and the second radius d2 is formed to be greater than the third radius d3. In other words, the third recessed portion 136 may be formed closest to the center C of the filter, followed by the second recessed portion 126 and the first recessed portion 116 in the order.

The first protrusion 241, the second protrusion 242, and the third protrusion 243 may have different heights that is from the upper surface of the peripheral member 250 to the lowest surface of each protrusion.

That is, the first height h1 may be greater than the second height h2, and the second height h2 may be greater than the third height h3. In other words, the first protrusion 241 may be formed to be the thickest and the third protrusion 243 may be formed to be the thinnest. This means that the shape of each protrusion is different.

The shapes of the first recessed portion 116 and the first protrusion 241 correspond to each other, and the shapes of the second recessed portion 126 and the second protrusion 242 correspond to each other, and the shapes of the third recessed portion 136 and the third protrusion 243 correspond to each other, and thus each filter may be coupled to the head assembly 400 only at a predetermined position.

In response to the second filter 120 being inserted into the first receiving member 211, the second recessed portion 126 formed in the second filter 120 may interfere with the first protrusion 241 formed in the first receiving member 211 so as to prevent the second filter 120 from being coupled to the head assembly 400.

The first height h1 of the first protrusion 241 is greatest, and thus in response to the second filter 120, the third filter 130, or the fourth filter 140 being inserted into the first receiving member 211, it is possible to prevent each of the filter from being inserted to a position of being coupled to the head assembly 400.

In response to the first filter 110 being inserted into the second receiving member 212, the first recessed portion 116 formed in the first filter 110 may interfere with the second protrusion 242 formed in the second receiving member 212 so as to prevent the first filter 110 from being coupled to the head assembly 400.

The second protrusion 242 has the second height h2, and the first protrusion 241 has the first height h1 that is greater than the second height h2. Accordingly, because the first recessed portion 116 is deeply recessed, the first recessed portion 116 may not interfere with the second protrusion 242. However, because the second protrusion 242 protrudes from an inner circumferential surface at a position away from the center C of the filter by the second radius d2, the second protrusion 242 protrudes more inward than the first protrusion 241 with respect to the radial direction of the filter. Accordingly, the second protrusion 242 may prevent the first filter 110 from being inserted into the second receiving member 212 and from being coupled to the head assembly 400.

In the same manner as the above method, the interference of the second protrusion 242 may prevent the third filter 130 including the third recessed portion 136 having a relatively small depth, from being inserted into the second receiving member 212 and from being coupled to the head assembly 400.

Therefore, the plurality of filters 100 includes the plurality of recessed portions corresponding to the plurality of protrusions formed in the receiving member 210 of the filter case 200 receiving each filter. Accordingly, upon replacing the filter, it is possible to prevent the filter from being assembled in a position other than a designated position.

Because the incorrect assembly of filter is prevented, it is possible to prevent internal leakage or reduction of the water purification performance of the water purifying filter assembly 1.

In addition, by forming a recessed portion that identifies the type of filters and specifies a manufacturer, it is possible to prevent the use of counterfeit products.

The water purifying filter assembly according to one embodiment of the present disclosure is illustrated and described as including the recessed portion formed in the filter and the protrusion formed in the filter case, but is not limited thereto. It should be understood that the recessed portion may be formed in filter case and the protrusion may be formed in the filter.

Figure 12:
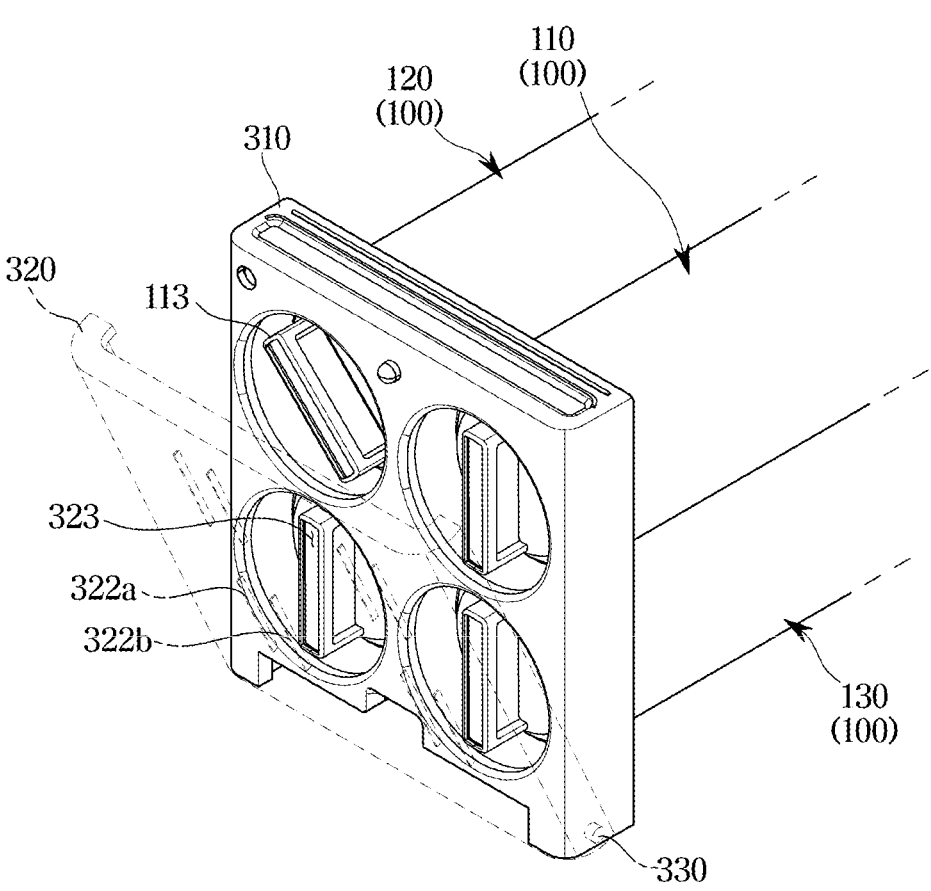
FIG. 12 is a view illustrating a state in which a cover member is not in contact with a handle of the water purifying filter assembly according to an embodiment of the disclosure.
Figure 13:
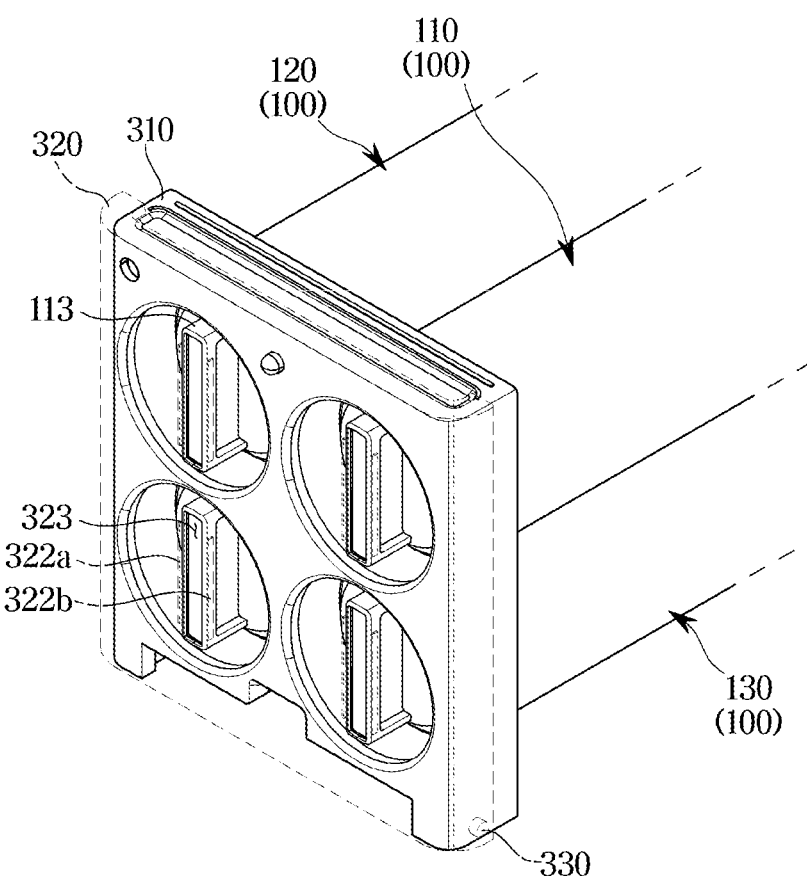
FIG. 13 is a view illustrating a state in which the cover member is in contact with the handle of the water purifying filter assembly according to an embodiment of the disclosure.
Figure 14:
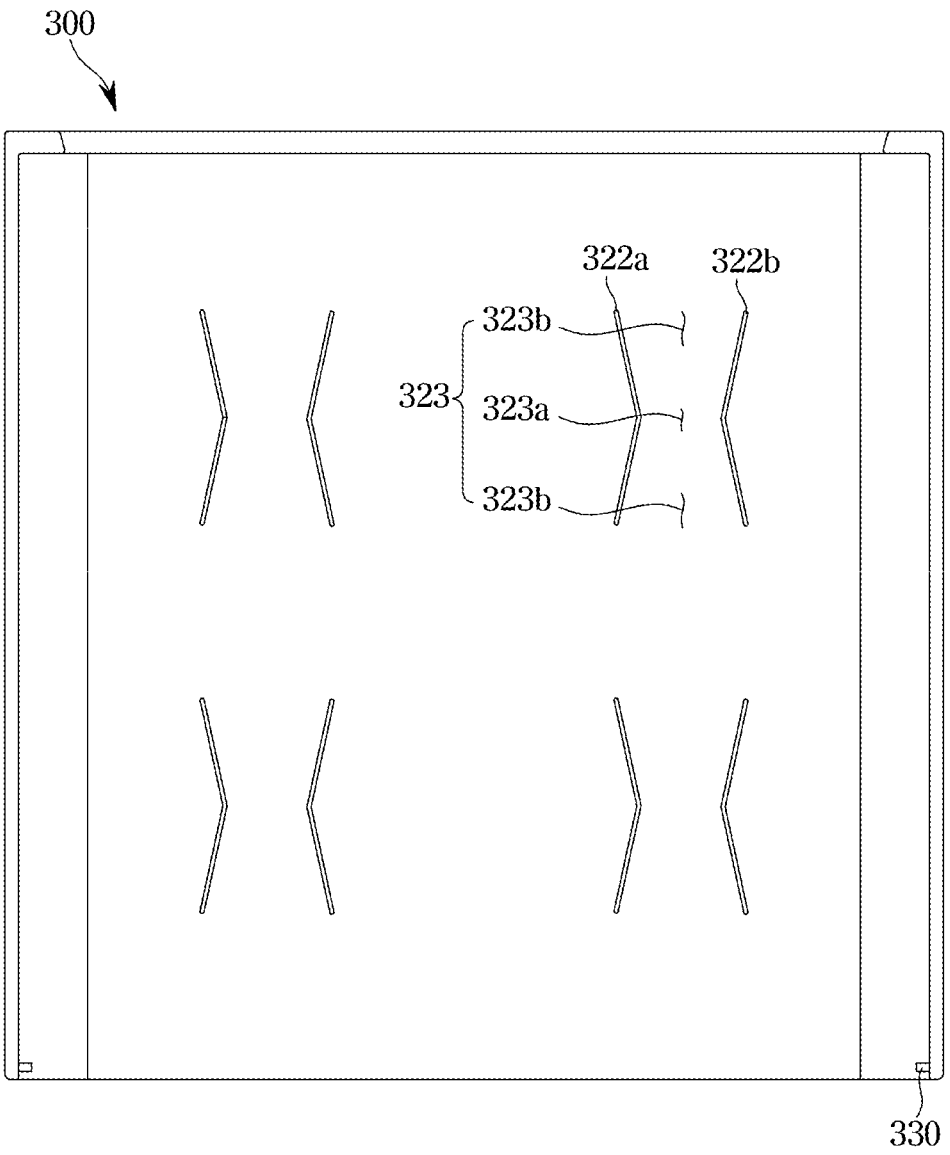
FIG. 14 is a view illustrating a modified example of the cover member of the water purifying filter assembly according to an embodiment of the disclosure.

FIG. 12 is a view illustrating a state in which a cover member is not in contact with a handle of the water purifying filter assembly according to one embodiment of the present disclosure. FIG. 13 is a view illustrating a state in which the cover member is in contact with the handle of the water purifying filter assembly according to one embodiment of the present disclosure. FIG. 14 is a view illustrating a modified example of the cover member of the water purifying filter assembly according to one embodiment of the present disclosure.

Referring to FIGS. 12 and 13, the cover member 300 may include the inner bracket 310 and the outer bracket 320.

The inner bracket 310 includes a plurality of insertion holes through which the handle 113 formed on the bottom surface of the plurality of filters 100 passes, and the outer bracket 320 is coupled to the inner bracket 310 so as to open and close from the outside of the inner bracket 310.

The outer bracket 320 may be rotatably coupled to the inner bracket 310 through a hinge 330.

The outer bracket 320 may include a door block 322. The door block 322 may include a first block 322a and a second block 322b.

The first block 322a and the second block 322b may extend in one direction. However, the extending direction is not limited thereto, and may extend in various directions according to a coupling method or a coupling direction of the filter and the head assembly 400. Further, the first block 322a and the second block 322b may protrude and extend toward the handle 113.

The outer bracket 320 may further include a mounting member 323 formed between the protruding first block 322a and the second block 322b. The mounting member 323 may be a space between the first block 322a and the second block 322b. The handle 113 of the filter may be in contact with the mounting member 323.

In other words, the handle 113 of the filter may be arranged to face the mounting member 323. In addition, the handle 113 of the filter may be provided to be accommodated in the mounting member 232. The handle 113 of the filter may be provided to be mounted on the mounting member 232.

The door block 322 may be provided with only the first block 322a or only the second block 322b.

The door block 322 may be arranged to face the handle 113 of the filter. That is, at a position in which a front surface of the handle 113 facing the door block 322 faces the mounting member 323 of the outer bracket 320, a portion of a side surface of the handle 113 and the door block 322 may be parallel to each other. The side surface of the handle 113 is a surface extending from the front surface of the handle 113 toward the longitudinal direction of the filter.

The configuration of the above-described cover member 300 is not limited thereto, and the cover member 300 may be composed of only the outer bracket 320. Alternatively, the cover member 300 may be formed on the frame 10 or the filter case 200, and may be formed to include the inner bracket 310.

As illustrated in FIG. 12, in response to the filter not being completely rotated and not being coupled to the head assembly 400, the door block 322 and the handle 113 may not be in contact with each other.

That is, in response to the plurality of filters 100 not being inserted into the respective designated receiving member 210, the filters may not be completely rotated as illustrated in FIG. 12. Although not shown in the drawings, the filter may protrude toward the cover member 300.

Particularly, the handle 113 may not be in contact with the mounting member 323 of the outer bracket 320. In this case, the door block 322 may interfere with the handle 113 and thus the outer bracket 320 may not be closed. At this time, from the outside of the water purifying filter assembly 1, a user can confirm that the coupling is not performed correctly.

As shown in FIG. 13, in response to the filter being completely rotated and coupled to the head assembly 400, the door block 322 and the handle 113 may come into contact with each other.

That is, this is the state in which the plurality of filters 100 are all correctly inserted into each designated receiving member 210, and the filter and the head assembly 400 are coupled in place. In this case, the handles 113 are all aligned in the same direction. Particularly, the handle 113 is aligned with the extending direction of the door block 322.

At this time, the handle 113 is in contact with the mounting member 323 of the outer bracket 320. In this case, the door block 322 may not interfere with the handle 113 and thus the outer bracket 320 may be closed. Accordingly, a user can recognize that the filter and the head assembly 400 are correctly coupled to each other.

As shown in FIG. 14, the door block 322 may include a shape in which a middle portion is bent. Particularly, the mounting member 323 may include a middle member 323*a* and a peripheral member 323*b*.

Because the middle portion of the door block 322 includes a curved shape, the middle member 323*a* of the mounting member 323 may be formed to be narrower than the peripheral member 323*b*.

A width of the middle member 323*a* may be the same as a width of the handle 113, and a width of the mounting member 323 may be increased toward the peripheral member 323*b*. That is, the mounting member 323 may include a free space, in which the cover member 300 is coupled to the filter, to a limit that water does not leak.

Figure 15:
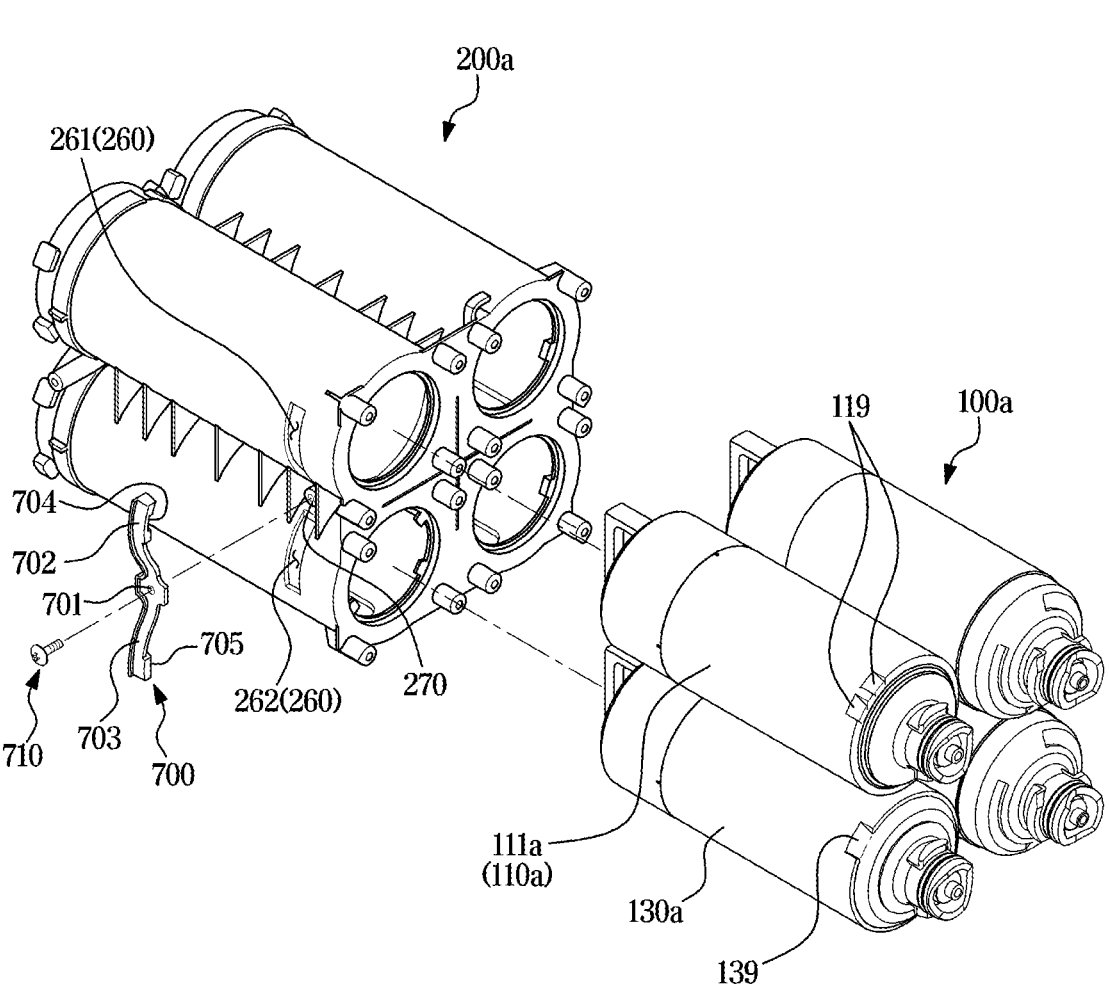
FIG. 15 is an exploded perspective view illustrating a main configuration of a water purifying filter assembly according to an embodiment of the disclosure.
Figure 16:
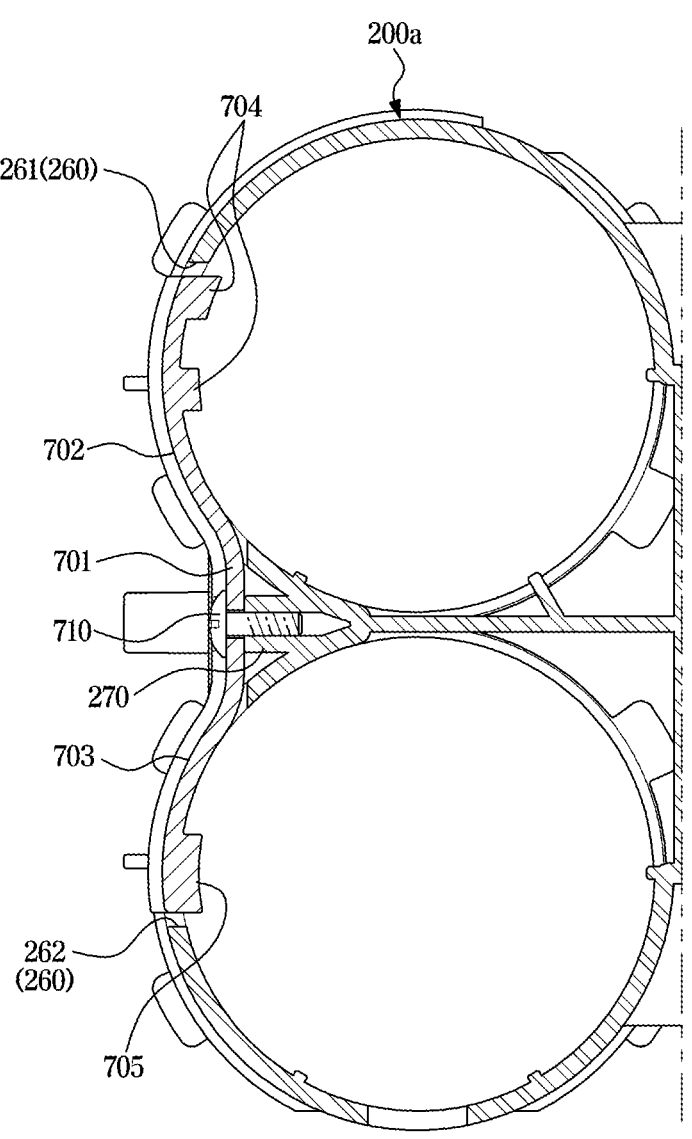
FIG. 16 is a partially cross-sectional view illustrating a state in which a filter is not mounted on a filter case of FIG. 15 according to an embodiment of the disclosure.
Figure 17:
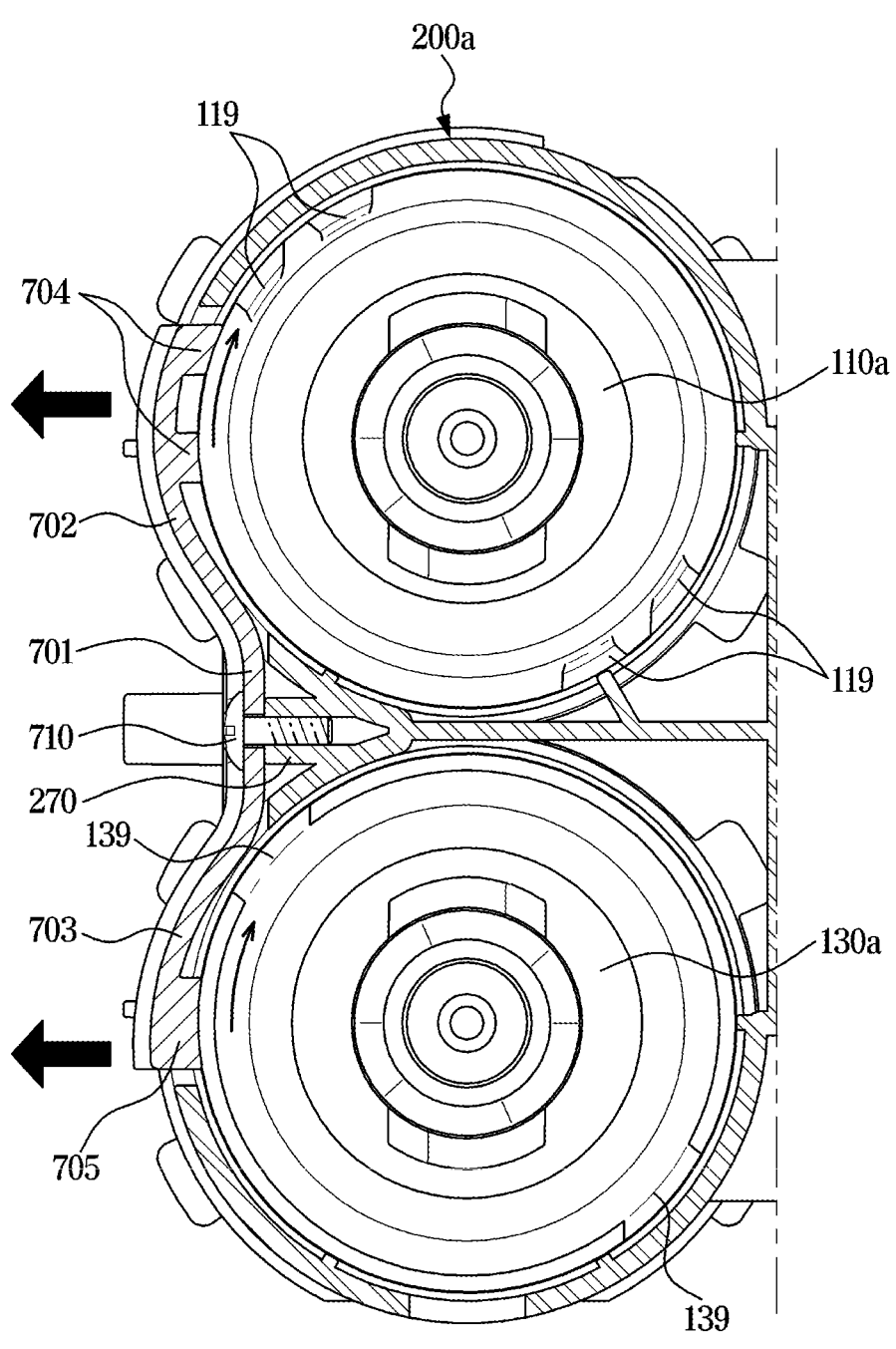
FIG. 17 is a partially cross-sectional view illustrating a state in which the filter is mounted to the filter case of FIG. 15 according to an embodiment of the disclosure.

FIG. 15 is an exploded perspective view illustrating a main configuration of a water purifying filter assembly according to another embodiment of the present disclosure. FIG. 16 is a partially cross-sectional view illustrating a state in which a filter is not mounted on a filter case of FIG. 15. FIG. 17 is a partially cross-sectional view illustrating a state in which the filter is mounted to the filter case of FIG. 15.

Referring to FIG. 15, a water purifying filter assembly according to another embodiment of the present disclosure may include a filter case 200*a*, a plurality of filters 100*a* inserted into the filter case 200*a*, and an interference rib 700 mounted on the filter case 200*a*.

Hereinafter differences from the water purifying filter assembly according to one embodiment of the present disclosure will be mainly described, and other components may be described using the same reference numerals as the water purifying filter assembly according to one embodiment of the present disclosure.

The filter case 200*a* may be engaged with the cover member 300 (refer to FIG. 3) to allow the plurality of filters 100*a* to be separately accommodated therein. The plurality of filters 100*a* may be disposed adjacent to each other through the filter case 200*a*. That is, because the filter is compactly arranged, a size of the water purifier may be reduced. In addition, it may be provided for a user to easily withdraw or insert the plurality of filters 100*a*. The plurality of filters 100*a* may be provided to be inserted into or withdrawn from the filter case 200*a*, which may be the same as those of the water purifying filter assembly according to the previously described embodiment of the present disclosure.

Unlike the water purifying filter assembly according to the previously described embodiment of the present disclosure, the interference rib 700 may be mounted on a side surface of the filter case 200*a* in the water purifying filter assembly according to another embodiment of the present disclosure.

The filter case 200*a* may include a cutout 260 formed in the first receiving member 211 (refer to FIG. 6) in which a first filter 110*a* is received, and formed in the third receiving member 213 (refer to FIG. 6) in which a third filter 130*a* is received.

The cutout 260 may include a first cutout 261 and a second cutout 262. The first cutout 261 may be formed in the first receiving member 211 receiving the first filter 110*a*. The second cutout 262 may be formed in the third receiving member 213 receiving the third filter 130*a*.

The first cutout 261 and the second cutout 262 may be formed on a side portion of the filter case 200*a*. However, the position of the cutout 260 is not limited thereto and may be changed according to the mounting position of the interference rib 700. The cutout 260 may be provided in the shape corresponding to the shape of the interference rib 700. Particularly, the cutout 260 may be provided in a shape corresponding to a first extension 702 and a second extension 703 of the interference rib 700.

The filter case 200*a* may include a fastening member coupler 270 formed between the first cutout 261 and the second cutout 262. As a separate fastening member 710 is coupled to the fastening member coupler 270, the interference rib 700 may be coupled to the filter case 200*a*. However, the position of the fastening member coupler 270 may also be changed according to the position of the interference rib 700.

The interference rib 700 may include a fastener 701. As the fastening member 710 is coupled to the fastener 701 of the interference rib 700 and the fastening member coupler 270 of the filter case 200*a*, the interference rib 700 and the filter case 200*a* may be coupled to each other. The fastener 701 may be formed in an approximately central portion of the interference rib 700.

The interference rib 700 may include the first extension 702 and the second extension 703 extending from the fastener 701 along an outer circumferential surface of the filter case 200*a*. Particularly, the first extension 702 may extend upward along an outer circumferential surface of the first receiving member 211 of the filter case 200*a*. The second extension 703 may extend downward along an outer circumferential surface of the third receiving member 213 of the filter case 200*a*.

The interference rib 700 may include a first interference member 704 protruding from the first extension 702 toward the inside of the filter case 200*a*. The first interference member 704 may be provided in a direction substantially perpendicular to the first extension 702. The interference rib 700 may include a second interference member 705 protruding from the second extension 703 toward the inside of the filter case 200*a*. The second interference member 705 may be provided in a direction substantially perpendicular to the second extension 703.

Two first interference members 704 positioned above the interference rib 700 are provided, and a single second interference member 705 positioned below the interference rib 700 is provided. Accordingly, it is possible to prevent the incorrect assembly of the first filter 110*a* and the third filter 130*a*. The relationship between the plurality of filters 100*a* and the interference rib 700 will be described later.

The interference rib 700 may be formed of a material having elasticity. Accordingly, in response to an external force being applied from the inside of the filter case 200*a* toward the interference rib 700, the interference rib 700 may be deformed in shape, so as to be pushed out of the filter case 200*a*. Details related to this will be described later.

The first filter 110*a* may include a first guide groove 119. The first guide groove 119 may be provided in a shape corresponding to the first interference member 704 of the interference rib 700. The first guide groove 119 may be formed in the first housing 111*a* of the first filter 110*a*. However, the position of the first guide groove 119 is not limited thereto and may be changed according to the position of the interference rib 700. As two first interference members 704 of the interference rib 700 are provided, two first guide grooves 119 may also be provided.

The third filter 130*a* may include a second guide groove 139. The second guide groove 139 may be provided in a shape corresponding to the second interference member 705 of the interference rib 700. As the single second interference member 705 of the interference rib 700 is provided, a single second guide groove 139 may be provided according to the number of the second interference members.

The first interference member 704 of the interference rib 700 may be pushed out of the filter case 200*a* by being pressed by the first filter 110*a*, and the second interference member 705 may be pushed out of the filter case 200*a* by being pressed by the third filter 130*a*. Details related to this will be described later.

The first guide groove 119 and the second guide groove 139 may be provided to be inclined along the insertion direction of the first filter 110*a* and the third filter 130*a*. Particularly, the first guide groove 119 and the second guide groove 139 may be provided to be inclined with respect to the side surfaces of the first filter 110*a* and the third filter 130*a*. That is, the first guide groove 119 and the second guide groove 139 may be provided to be inclined with respect to the vertical member 118 (refer to FIG. 9) of the first filter 110*a* and the third filter 130*a*.

Referring to FIG. 16, in response to the plurality of filters 100*a* not being inserted into the filter case 200*a*, the interference rib 700 may protrude to the inside of the filter case 200*a*. Particularly, the interference rib 700 may be inserted into the filter case 200*a* through the cutout 260 formed in the filter case 200*a*. The first interference member 704 of the interference rib 700 may protrude to the inside of the filter case 200*a* through the first cutout 261 of the filter case 200*a*. The second interference member 705 of the interference rib 700 may protrude to the inside of the filter case 200*a* through the second cutout 262 of the filter case 200*a*.

Referring to FIG. 17, in response to the first filter 110*a* and the third filter 130*a* being inserted into the filter case 200*a*, the interference rib 700 may be moved to the outside of the filter case 200*a*.

Particularly, as the first guide groove 119 formed in the first filter 110*a* is provided to be inclined with respect to the insertion direction of the first filter 110*a*, the first interference member 704 of the interference rib 700 may be pressed to the outside of the filter case 200*a* along the inclined surface of the first guide groove 119. Thereafter, in response to the first filter 110*a* being rotated and coupled to the mounting member 410 (refer to FIG. 4) of the head assembly 400 (refer to FIG. 4), the interference rib 700 may be maintained at a state of being pressed by the outer circumferential surface of the first housing 111*a* of the first filter 110*a* and thus maintained at a state of being pushed to the outside of the filter case 200*a*.

In addition, as the second guide groove 139 formed in the third filter 130*a* is provided to be inclined with respect to the insertion direction of the third filter 130*a*, the second interference member 705 of the interference rib 700 may be pressed to the outside of the filter case 200*a* along the inclined surface of the second guide groove 139. Thereafter, in response to the third filter 130*a* being rotated and coupled to the mounting member 410 of the head assembly 400, the interference rib 700 may be maintained at a state of being pressed by the outer circumferential surface of the third filter 130*a* and thus maintained at a state of being pushed to the outside of the filter case 200*a*. The interference rib 700 may be formed of a material having elasticity, and such a shape deformation may be possible.

In response to a filter other than the first filter 110*a* being inserted into the first receiving member of the filter case 200*a*, the insertion of the filter may be prevented by the first interference member 704 of the interference rib 700. In addition, in response to a filter other than the third filter 130*a* being inserted into the third receiving member 213, the insertion of the filter may be prevented by the second interference member 705 of the interference rib 700.

Therefore, as the interference rib 700 is mounted on the outside of the filter case 200*a* and protrudes inward, it is possible to more reliably prevent the incorrect assembly of a filter. Particularly, the incorrect assembly of the plurality of filters 100*a* may be primarily prevented by the interference rib 700, and may be secondarily prevented by the protrusions 241, 242, 243, and 244 (refer to FIG. 7) formed in the filter case 200*a* and by the recessed portions 116, 126, 136, and 146 (refer to FIG. 8) formed in the filters.

In the description of the present disclosure, the interference rib 700 is provided to guide the mounting of the first filter 110*a* and the third filter 130*a*, and provided to interfere with the mounting of the second filter 120 and the fourth filter 140, but is not limited thereto. Alternatively, the interference rib 700 may be mounted on a side into which the second filter 120 and the fourth filter 140 are inserted. Further, the position of the cutout 260 of the filter case 200*a* may be changed according to the position of the interference rib 700. In addition, when the interference rib 700 is provided in a structure guiding the insertion of the second filter 120 and the fourth filter 140 and in a structure preventing the incorrect assembly of the first filter 110*a* and the third filter 130*a*, the above-mentioned first guide groove 119 and second guide groove 139 may be formed in the second filter 120 and the fourth filter 140.

In addition, as another embodiment for preventing the incorrect assembly of the filter, it is possible to prevent the incorrect assembly by forming different diameters of the inlet and outlet member 114 (refer to FIG. 4) provided in each of the plurality of filters 100*a*. As the diameters of the inlet and outlet members 114 of the plurality of filters 100*a* are formed to be different from each other, the diameter of the mounting member 410 of the head assembly 400 may also be formed to be different from each other in accordance with the diameters of the inlet and outlet member. In this case, the respective filters 110, 120, 130, and 140 may not include the recessed portion and the filter case 200 may not include the protrusion. Therefore, by forming the inlet and outlet portions 114 having different diameters, it is possible to prevent the incorrect assembly between the plurality of filters 100 and 100*a* with a simple structure.

When replacing a filter, it is possible to place the corresponding filter only to a predetermined position because a recessed portion is formed in the filter and a protrusion is formed in a filter case.

It is possible to prevent a filter from being incorrectly assembled due to a user's carelessness, thereby preventing reduction in a performance of a water purifying filter assembly.

By using a recessed portion of a filter, it is possible to identify the type of filter and to prevent the use of counterfeit products.

One aspect of the present disclosure provides a water purifying filter assembly including a filter, a filter case including a receiving member receiving the filter, and a head assembly mounted on one side of the filter case and coupled to the filter. The filter includes a recess formed on an outer circumferential surface thereof. The receiving member includes a protrusion formed in a shape corresponding to the recess. The filter is fixedly coupled to the head assembly at a position in which the recessed portion and the protrusion are engaged with each other.

The filter may be a first filter and the receiving member may be a first receiving member, and the water purifying filter assembly may further include a second filter including a recessed portion formed in a shape different from the recessed portion of the first filter. In response to the second filter being inserted into the first receiving member, coupling of the second filter and the head assembly may be prevented by the protrusion.

The recessed portion may be formed on a side close to the head assembly with respect to a longitudinal direction of the filter.

The filter may be a first filter and the receiving member may be a first receiving member. The water purifying filter assembly may further include a second filter including a recessed portion formed in a shape the same as the recessed portion of the first filter and formed in a position different from the position of the recessed portion of the first filter.

The recessed portion may be provided with a pair of the recessed portions symmetrical with respect to a center of the filter.

The receiving member may further include a peripheral member extending radially inwardly from an inner circumferential surface. The protrusion may extend further inward than the peripheral member from the inner circumferential surface.

The receiving member may further include a peripheral member extending radially inwardly from an inner circumferential surface, and the protrusion may extend further along the longitudinal direction of the filter than the peripheral member.

The head assembly may include a mounting member coupled to the filter and the filter case. The filter may include an inlet and outlet member including an opening to allow water to pass therethrough, and a mounting protrusion protruding radially outward from the inlet and outlet member. In response to the rotation of the filter, the mounting protrusion may be coupled to an inside of the mounting member.

The filter may include a handle provided on one side of the filter, and the water purifying filter assembly may further include a cover member coupled to the filter case to receive and cover the handle.

The cover member may include an inner bracket including a receiving hole through which the handle passes, and an outer bracket coupled to the inner bracket so as to open and close the receiving hole from the outside of the inner bracket.

The outer bracket may include a door block extending from an inner surface toward the handle, and in response to the filter being incorrectly assembled to the head assembly, the door block may interfere with the handle and thus the outer bracket may be not closed.

The filter may be a first filter, and the water purifying filter assembly may further include a second filter arranged in a first direction with respect to the first filter, and a third filter arranged in a second direction different from the first direction with respect to the first filter. The filter case may include a first receiving member receiving the first filter, a second receiving member receiving the second filter, and a third receiving member receiving the third filter.

A recessed portion formed in the first to third filters may be provided in different shapes.

The water purifying filter assembly may further include an interference rib mounted on the filter case and protruding inward. The filter may include a guide groove formed to be inclined with respect to a direction in which the filter is inserted into the filter case, and provided, in response to the filter being inserted into the filter case, to press the interference rib outward.

The filter case may include a cutout provided to allow the interference rib to be inserted into the filter case.

Another aspect of the present disclosure provides a water purifying filter assembly including a first filter, a second filter arranged in a first direction with respect to the first filter, a third filter arranged in a second direction different from the first direction with respect to the first filter, and a filter case including a plurality of receiving members provided to be allow the first to third filters to be inserted thereinto and withdrawn therefrom. Each of the plurality of receiving members includes a protrusion. A recessed portion including a shape corresponding to each of the protrusions is formed on each outer circumferential surface of the first, second and third filters.

The recessed portion formed in the first filter, the second filter, and the third filter may be a first recessed portion, a second recessed portion, and a third recessed portion, respectively. The first recessed portion, the second recessed portion and the third recessed portion may be provided in different shapes so as to prevent an incorrect assembly of filters.

The water purifying filter assembly may further include an interference rib mounted on the filter case and including an interference member protruding toward the receiving member of the first filter. The first filter may include a guide groove including an inclined surface to press the interference member outward. In response to the second filter or the third filter being inserted to the receiving member of the first filter, the interference member may prevent the incorrect assembly of filter.

Another aspect of the present disclosure provides a water purifying filter assembly including a filter including a recessed portion, a guide groove and a handle, a filter case including a receiving member receiving the filter, and a protrusion formed in a shape corresponding to the recessed portion, a head assembly mounted on one side of the filter case and coupled to the filter, an interference rib mounted to the filter case and including an interference member protruding toward the receiving member and formed in a shape corresponding to the guide groove, and a cover member arranged on the other side of the filter case that is opposite to the head assembly, the cover member including a door block to which the handle is mounted. As the filter is inserted into the filter case and the guide groove passes through the interference rib and the protrusion is mounted to the recessed portion, the filter is fixedly coupled to the head assembly and the handle is in contact with the door block and the cover member is closed, thereby completing the assembly thereof.

The filter may be a first filter, and the water purifying filter assembly may further include a second filter arranged in a first direction with respect to the first filter, and a third filter arranged in a second direction different from the first direction with respect to the first filter. The recessed portion formed in the first filter, the second filter, and the third filter may be a first recessed portion, a second recessed portion, and a third recessed portion, respectively. The first recessed portion, the second recessed portion and the third recessed portion may be provided in different shapes so as to prevent an incorrect assembly of filters. While the present disclosure has been particularly described with reference to exemplary embodiments, it should be understood by those skilled in the art that various changes in form and details may be made without departing from the spirit and scope of the present disclosure.

The invention claimed is:

1. A water purifying filter assembly comprising:
   a filter case including a receiving member having a protrusion; and a head assembly, wherein the protrusion is configured to be receivable in a recessed portion on an outer circumferential surface of a filter so that, when the filter is placed in the receiving member with the protrusion received in the recessed portion, an inlet and outlet member of the filter extends out of the receiving member and is inserted into the head assembly and is fixedly couplable to the head assembly by rotation of the filter, and when the filter is placed in the receiving member with the protrusion not received in the recessed portion, the inlet and outlet member of the filter is prevented from being inserted into the head assembly and fixedly couplable to the head assembly.

2. The water purifying filter assembly of claim 1, wherein, the receiving member is a first receiving member, and the water purifying filter assembly further comprises:

a second receiving member including a protrusion shaped differently than the protrusion of the first receiving member, wherein, when a first filter having a recessed portion configured to receive the protrusion of the first receiving member is inserted into the second receiving member, coupling of the first filter to the head assembly is prevented by the protrusion of the second receiving member, and when a second filter having a recessed portion configured to receive the protrusion of the second receiving member is inserted into the first receiving member, coupling of the second filter to the head assembly is prevented by the protrusion of the first receiving member.

3. The water purifying filter assembly of claim 1, wherein, the recessed portion of the filter is adjacent to the head assembly when the filter is placed in the receiving member.

4. The water purifying filter assembly of claim 1, wherein, the receiving member is a first receiving member, and the water purifying filter assembly further comprises:

a second receiving member including a protrusion having a same shape as the protrusion of the first receiving member, the protrusion of the second receiving member being arranged at a position relative to the second receiving member that is different from a position of the protrusion of the first receiving member relative to the first receiving member.

5. The water purifying filter assembly of claim 1, further comprising:

the filter, wherein the filter is provided with a pair of the recessed portions arranged symmetrically with respect to a longitudinal center of the filter.

6. The water purifying filter assembly of claim 1, wherein, the receiving member further comprises:

a peripheral member extending radially inwardly from an inner circumferential surface of the receiving member, wherein, the protrusion extends away from the peripheral member, and the protrusion extends further inward than the peripheral member from the inner circumferential surface.

7. The water purifying filter assembly of claim 1, wherein, the receiving member further comprises:

a peripheral member extending radially inwardly from an inner circumferential surface of the receiving member, wherein, the protrusion extends away from the peripheral member, and the protrusion extends further along a longitudinal direction of the filter than the peripheral member.

8. The water purifying filter assembly of claim 1, wherein, the head assembly comprises:

a mounting member coupled to the filter case and couplable to the filter, wherein the mounting member is configured to engage with a mounting protrusion protruding radially outward from the inlet and outlet member of the filter so that the mounting protrusion of the filter is coupled to an inside of the mounting member when the protrusion of the receiving member is received in the recessed portion and the filter is rotated.

9. The water purifying filter assembly of claim 1, wherein, the water purifying filter assembly further comprises:

a cover member coupled to the filter case at a side of the filter case opposite to the head assembly and configured to open to receive the filter as the filter is being placed in the receiving member, and to close to cover a handle of the filter when the filter is fixedly coupled to the head assembly.

10. The water purifying filter assembly of claim 9, wherein, the cover member comprises:

an inner bracket including a receiving hole through which the filter passes as the filter is being placed in the receiving member; and an outer bracket coupled to the inner bracket so as to open and close the receiving hole from outside of the inner bracket.

11. The water purifying filter assembly of claim 10, wherein, the outer bracket comprises:

a door block extending from an inner surface toward the handle and configured so that, when the filter is fixedly coupled to the head assembly, the outer bracket is closable, and when the filter is incorrectly received in the receiving member, the door block interferes with the handle so that the outer bracket is not closable.

12. The water purifying filter assembly of claim 1, wherein, the receiving member is a first receiving member, and the water purifying filter assembly further comprises:

a second receiving member arranged adjacent to the first receiving member and in a first direction away from the first receiving member; and a third receiving member arranged adjacent to the first receiving member and in a second direction away from the first receiving member.

13. The water purifying filter assembly of claim 12, wherein, each of the first, second, and third receiving members have differently configured protrusions that are respectfully receivable in differently configured recessed portions of different filters.

14. The water purifying filter assembly of claim 1, further comprising:

an interference rib mounted on the filter case and protruding inward from an inner circumferential surface of the receiving member,

23 wherein the interference rib is configured so that, the interference rib engages with a guide groove formed on an outer circumferential surface of a filter to guide proper placement of the filter in the receiving member, and the interference rib is pressed outward during insertion of the filter into the receiving member when the guide groove engaged with the interference rib is formed to be inclined with respect to a direction in which the filter is inserted into the filter case.

15. The water purifying filter assembly of claim 14, wherein, the filter case includes a cutout configured to allow the interference rib to protrude into the filter case.

16. The water purifying filter assembly of claim 1, further comprising:

the filter.

* * * * *

24